United States Patent
Bostrom et al.

(10) Patent No.: US 8,052,209 B2
(45) Date of Patent: Nov. 8, 2011

(54) AUTOMATIC LOCKING SCBA MOUNTING BRACKET ASSEMBLY

(75) Inventors: Paul C. Bostrom, Hartland, WI (US); Wayne R. Block, South Milwaukee, WI (US); Matthew C. Horn, Elkhorn, WI (US)

(73) Assignee: H.O. Bostrom Company, Inc., Waukesha, WI (US)

(*) Notice: Subject to any disclaimer, the term of this patent is extended or adjusted under 35 U.S.C. 154(b) by 0 days.

(21) Appl. No.: 12/758,438

(22) Filed: Apr. 12, 2010

(65) Prior Publication Data

US 2010/0219220 A1     Sep. 2, 2010

Related U.S. Application Data

(63) Continuation-in-part of application No. 11/840,272, filed on Aug. 17, 2007, now Pat. No. 7,963,597.

(51) Int. Cl.
    *A47C 7/62*     (2006.01)
    *A47K 1/08*     (2006.01)
    *B60R 7/00*     (2006.01)

(52) U.S. Cl. ............. 297/188.04; 248/313; 224/275

(58) Field of Classification Search ............. 297/188.04, 297/188.11, 217.3; 224/275; 248/313, 316.1, 248/311.2, 154; 280/288.4, 727
See application file for complete search history.

(56) References Cited

U.S. PATENT DOCUMENTS

| | | | |
|---|---|---|---|
| 1,026,485 A | 5/1912 | Barr | |
| 1,158,983 A | 11/1915 | Casper | |
| 1,295,120 A | 2/1919 | Cartre | |
| 3,204,775 A | 9/1965 | Smith et al. | |
| 3,490,727 A | 1/1970 | Miller | |
| 3,737,133 A | 6/1973 | Boecker | |
| 3,971,591 A | 7/1976 | Ziaylek | |
| 4,586,687 A | 5/1986 | Ziaylek, Jr. | |
| 5,275,462 A | 1/1994 | Pond et al. | |
| 5,314,233 A | 5/1994 | Bostrom et al. | |
| D347,735 S | 6/1994 | Ziaylek, Jr. et al. | |
| 5,354,029 A | 10/1994 | Ziaylek, Jr. et al. | |
| 5,681,080 A | 10/1997 | Pond et al. | |
| 5,884,948 A | 3/1999 | Weinerman et al. | |

(Continued)

FOREIGN PATENT DOCUMENTS

DE     3538966     5/1987

(Continued)

OTHER PUBLICATIONS

Partial International Search Report mailed Sep. 5, 2008.

(Continued)

*Primary Examiner* — Milton Nelson, Jr.
(74) *Attorney, Agent, or Firm* — Andrus, Sceales, Starke & Sawall, LLP

(57) ABSTRACT

A mounting bracket assembly includes a clamping arrangement mounted for vertical movement on a mounting structure and is movable between an engaged position and disengaged position relative to a self-contained breathing apparatus held in the mounting bracket assembly. A camming arrangement is located between the clamping arrangement and the mounting structure for permitting and preventing vertical movement of the clamping arrangement relative to the mounting structure. A powered latching mechanism is engageable with a portion of the clamping arrangement for providing unlatched and latched positions. A control arrangement separate from the powered latching mechanism is operatively connected thereto to selectively control the powered latching mechanism and effect release of the self-contained breathing apparatus from the latched position when the vehicle is in a stationary and parked condition.

12 Claims, 19 Drawing Sheets

U.S. PATENT DOCUMENTS

| | | | |
|---|---|---|---|
| 6,161,706 | A | 12/2000 | McCord |
| 6,471,260 | B1 | 10/2002 | Weinerman et al. |
| 6,543,736 | B2 | 4/2003 | Field |
| 6,578,912 | B2 * | 6/2003 | Hansen et al. ............ 297/217.3 |
| 6,601,923 | B2 | 8/2003 | Pond et al. |
| 6,655,745 | B2 | 12/2003 | Fohrenkamm et al. |
| 6,702,242 | B1 | 3/2004 | Ziaylek, Jr. et al. |
| 6,883,766 | B1 | 4/2005 | Ziaylek et al. |
| D558,566 | S | 1/2008 | Ziaylek |
| D562,116 | S | 2/2008 | Ziaylek et al. |
| 7,448,586 | B2 | 11/2008 | Ziaylek et al. |
| 7,503,535 | B2 | 3/2009 | Ziaylek |
| 2006/0076820 | A1 | 4/2006 | Lackore |
| 2009/0045657 | A1 | 2/2009 | Bostrom et al. |
| 2009/0127416 | A1 | 5/2009 | Ziavlek |
| 2009/0235767 | A1 | 9/2009 | Garneau et al. |
| 2009/0250582 | A1 | 10/2009 | Ziaylek |

FOREIGN PATENT DOCUMENTS

| | | |
|---|---|---|
| DE | 3802978 | 7/1989 |
| FR | 2633189 | 12/1989 |
| FR | 2869670 | 11/2005 |
| GB | 811891 | 4/1959 |
| GB | 2205733 | 12/1988 |
| GB | 2219561 | 12/1989 |

OTHER PUBLICATIONS

SCBA Restraint; The New "Ready-Set-Go" (RSG II) SCBA Restraint; Flamefighter Corporation; Model 18000; Publication Date Unknown.

Flamefighter Corp. SCBA Brackets and Accessories; New and Innovative SCBA Restraint:® 2007 Flamefighter Corporation; Publication Date Unknown.

ZICO Quic-Lock Mechanical Bracket; Model: QLM-U; www.ziamatic.com; Publication Date Unknown.

European International Search Report dated Apr. 21, 2011.

* cited by examiner

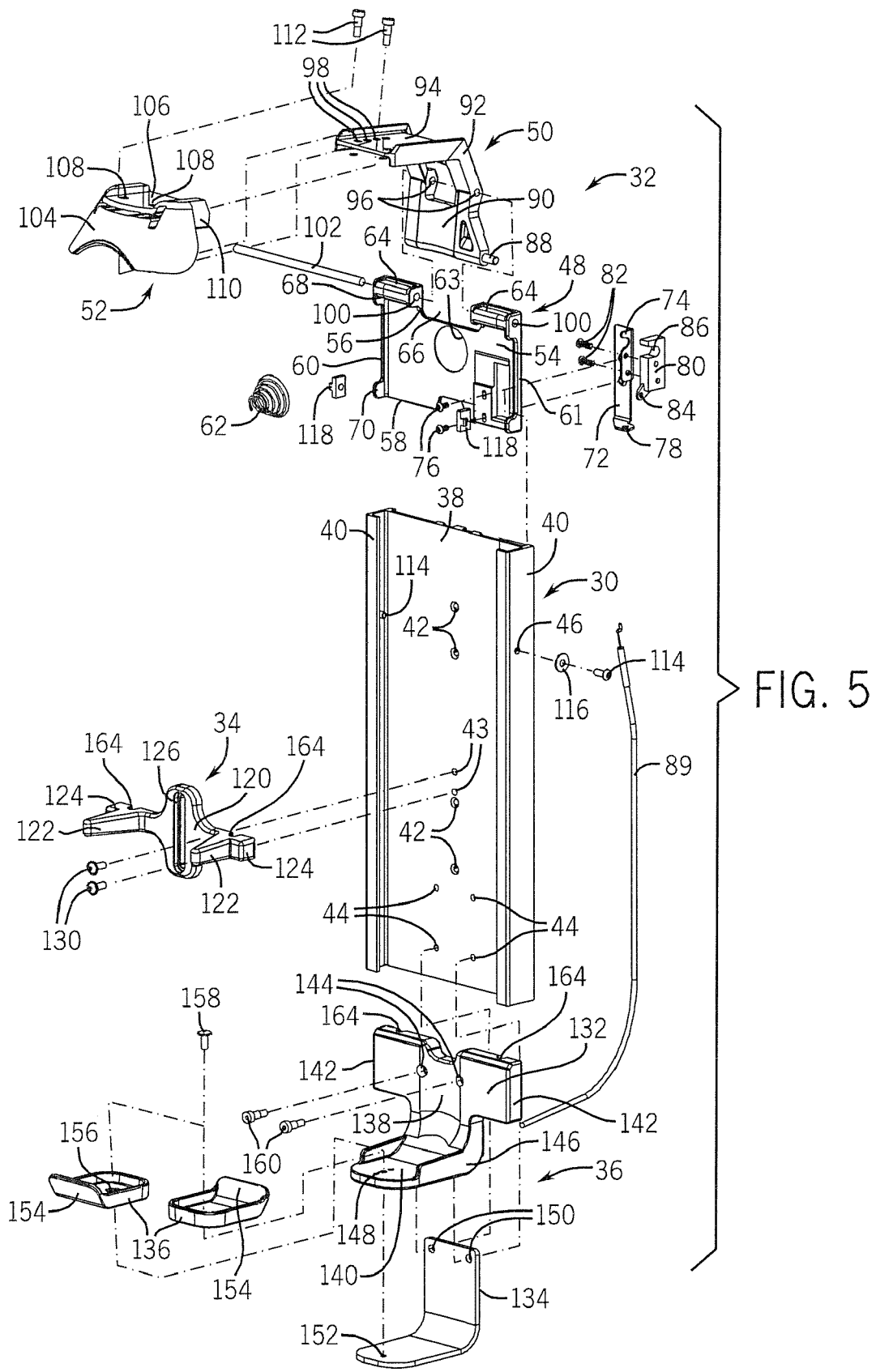

AUTOMATIC LOCKING SCBA MOUNTING BRACKET ASSEMBLY

CROSS REFERENCE TO RELATED APPLICATION

The present application is a continuation-in-part application based on and claiming priority from pending U.S. patent application Ser. No. 11/840,272, filed Aug. 17, 2007, which is fully incorporated herein by reference.

FIELD OF THE INVENTION

The present invention relates to an auto-locking holder apparatus, and relates more specifically to an automatic locking mounting bracket assembly for use in a vehicle for releasably restraining objects such as self-contained breathing apparatus equipment.

BACKGROUND OF THE INVENTION

It is generally known to provide holders for storage of objects such as tanks (e.g. cylinders, containers, etc.) for self-contained breathing apparatus (SCBA) in vehicles such as rescue vehicles, fire trucks and the like. SCBA holders can be integrated into an opening or cavity in a seat back portion of a seat within the vehicle. Storage of the SCBA in the seat back is intended to permit a user occupying the seat to rapidly don the SCBA in response to an event. However, applicable regulations typically require SCBAs to be restrained in a manner that ensures that the SCBA remains secure during certain scenarios such as collisions, abrupt vehicle maneuvers, etc.

The known holders for SCBAs typically have a restraint that secures the SCBA until release by a user. For example, one type of holder secures a tank in an elongated cavity in a seat with belts. Another example of a holder provides a restraint having a pivotable halo to hold the top of the tank in place. However, the known SCBA holders tend to require manual intervention in securing the tanks to the holders.

Accordingly, it is desirable to provide a releasable holder or mounting bracket assembly for an object such as an SCBA or like with an automatic locking feature that allows that SCBA to be freely installed for use in a vehicle in a manner which is fast, convenient and efficient. It is also desirable to provide a releasable mounting bracket assembly which is variously adjustable to accommodate different sizes and types of SCBAs. It is further desirable to provide a mounting bracket assembly which is releasable from different locations relative to an occupant of the vehicle seat. Moreover, it is desirable to provide a spring-loaded back pad which can be used with or without an SCBA in the mounting bracket assembly.

SUMMARY OF THE INVENTION

The invention relates to a mounting bracket assembly for releasably holding a self-contained breathing apparatus. The mounting bracket assembly includes a mounting plate, and a clamping arrangement secured on an upper portion of the mounting plate and movable between an unlatched position and a latched position relative to the self-contained breathing apparatus. A guide is connected on an intermediate portion of the mounting plate, and a support structure is mounted on a lower portion of the mounting plate. The clamping arrangement includes a pivot arm having an actuator plate biased forwardly of the mounting plate in the unlatched position, and a self-contained breathing apparatus engaging clamp swung upwardly above the mounting plate in the unlatched position. The clamping arrangement further includes a latching mechanism engageable and disengageable with the pivot arm for providing the latched and unlatched positions. Movement of the self-contained breathing apparatus against the actuator plate automatically swings and locks the clamp downwardly on an upper end of the self-contained breathing apparatus, and causes the pivot arm to engage the latching mechanism in the latched position. The guide centers and retains an intermediate portion of the self-contained breathing apparatus, and the support structure supports a lower portion of the self-contained breathing apparatus in the latched position.

The mounting plate has a pair of side channels, and a base adapted to be attached to a support surface. The clamping arrangement, the guide and the support structure are slidably received and retained in the channels. The clamping arrangement is vertically adjustable in the upper portion of the mounting plate. The guide is vertically adjustable in the intermediate portion of the mounting plate. The support structure is vertically adjustable in the lower portion of the mounting plate. The clamping arrangement further includes a slide carriage on which the latching mechanism is mounted, and on which the pivot arm is pivotally mounted. The slide carriage carries a spring for biasing the actuator plate forwardly in the unlatched position. The actuator plate forms a lower vertical extending portion of the pivot arm. The actuator plate is integrally joined to a portion that angles upwardly away from the actuator plate and is joined to a horizontally extending portion to which the clamp is adjustably secured. The guide is formed with a center section and a pair of spaced apart retaining arms. The support structure includes a foot, a foot support attached to the foot and a cradle adjustably mounted on the foot. The cradle is reversibly mounted on the foot.

Various provisions are made to enable release of the self-contained breathing apparatus from the latched position by an occupant of the vehicle seat to which the mounting plate is secured.

The mounting plate is secured to a frame of a vehicle seat, and a spring loaded back pad assembly is attached to the frame and movable between a folded up position and a folded down position. The back pad assembly is movable between the folded up and down positions regardless of the presence and absence of the self-contained breathing apparatus.

The back pad assembly includes a mounting bracket fixed to the vehicle seat frame, a lower pivot bracket attached to the mounting bracket, an upper pivot bracket assembly including a cushioned back pad pivotally connected to the lower pivot bracket and an over the center spring arrangement joined between the lower pivot bracket and the upper pivot bracket assembly.

In another aspect of the invention, an automatic locking mounting bracket assembly is provided for releasably holding a self-contained breathing apparatus. The mounting bracket assembly includes a mounting plate having a base and a pair of side channels integrally formed with the base. A clamping arrangement is slidably installed in the channels of the mounting plate on an upper portion thereof and is movable between an unlatched position and a latched position relative to the self-contained breathing apparatus. The clamping arrangement includes a slide carriage carrying a latching mechanism, a spring and a pivot pin. The clamping arrangement also includes a pivot arm pivotally mounted on the pivot pin of the slide carriage and having a vertically extending actuator plate, an angled portion and a horizontal extending portion with a clamp adjustably secured thereto. The actuator plate is biased forwardly of the mounting plate by the spring in the unlatched position and the clamp is swung upwardly above the mounting plate in the unlatched position. A forked guide is slidably installed in the channels of the mounting plate on an intermediate portion thereof. A support structure is slidably installed in the channels of the mounting plate on a lower portion thereof. The support structure includes a foot, a foot support reinforcing the foot and a cradle adjustably mounted to the foot. Movement of the self-contained breathing apparatus into the guide and the support structure and against the actuator plate automatically swings and locks the clamp downwardly on an upper end of the self-contained breathing apparatus and causes the pivot arm to engage the latching mechanism in the latched position.

The slide carriage has side edges with upper and lower stops slidably inserted in the channels. Fasteners and adjustment nuts are attached to the channels between the upper and lower stops, a distance between the upper and lower stops defining a vertical range of adjustment for the clamping arrangement. The latching mechanism is connected to a cable for effecting movement of the pivot arm to the unlatched position and release of the self-contained breathing apparatus from the clamp, the guide and the support structure.

In another aspect of the invention, a mounting bracket assembly is provided for releasably holding an elongated self-contained breathing apparatus. The mounting bracket assembly includes a clamping arrangement mounted for vertical movement on a mounting structure and movable between an engaged position and a disengaged position relative to the self-contained breathing apparatus. A camming arrangement is located between the clamping arrangement and the mounting structure for permitting and preventing vertical adjustment of the clamping arrangement relative to the mounting structure. The camming arrangement includes a cam member attached to an adjustment lever. The adjustment lever has a tab extending from a front portion thereof. The clamping arrangement is pivotally mounted on a pivot pin passing through a pair of tubular receivers, and the cam member is eccentrically mounted on the pivot pin for rotation therewith. The camming arrangement includes a biasing spring mounted on the pivot pin, engaged with the adjustment lever and located between one of the tubular receivers and the adjustment lever. The cam member is normally biased by the spring into engagement with the mounting structure to lock the clamping arrangement to the mounting structure. Movement of the adjustment lever against the bias of the spring permits disengagement of the cam member from the mounting structure to allow vertical adjustment of the clamping arrangement relative to the mounting structure.

In a further aspect of the invention, a mounting bracket assembly is installed in a vehicle for releasably holding an elongated self-contained breathing apparatus. The mounting bracket assembly includes a clamping arrangement secured on a mounting structure and movable between an unlatched position and a latched position relative to a self-contained breathing apparatus. The clamping arrangement includes a powered latching mechanism engageable with a portion of the clamping arrangement for providing the unlatched and latched positions. A control arrangement separate from the powered latching mechanism is operatively connected thereto to selectively control the powered latching mechanism and effect release of the self-contained breathing apparatus from the latched position when the vehicle is in a stationary and parked condition. The powered latching mechanism and the control arrangement are operably connected to an electrical system of the vehicle. The powered latching mechanism is preferably an electric latching mechanism positioned outside the mounting structure and connected to the clamping arrangement. The clamping arrangement is mounted for vertical movement on the mounting structure, and the powered latching mechanism is movable with the clamping arrangement along the mounting structure. The latched condition is attained by a mechanical locking of the portion of the clamping arrangement in the powered latching mechanism, and maintained during normal travel of the vehicle. The powered latching mechanism and the control arrangement are connected to a device such as a parking brake switch for indicating that the vehicle is in the stationary and parked position. The control arrangement is at least one control device located in the vehicle. The control device is preferably a switch located within a seat cushion of a seat equipped with the mounting bracket assembly. The switch is controlled by movement of a handle at a front portion of the seat cushion. The parking brake switch and the switch of the control arrangement must be in an on position to effect release of the self-contained breathing apparatus from the latched position. The parking brake switch and the switch of the control arrangement are in an off position during normal travel of the vehicle.

BRIEF DESCRIPTION OF THE INVENTION

The drawings illustrate the best mode presently contemplated of carrying out the invention. In the drawings:

FIG. 5 is an exploded view of FIG. 2;

DETAILED DESCRIPTION OF THE INVENTION

Figure 1:
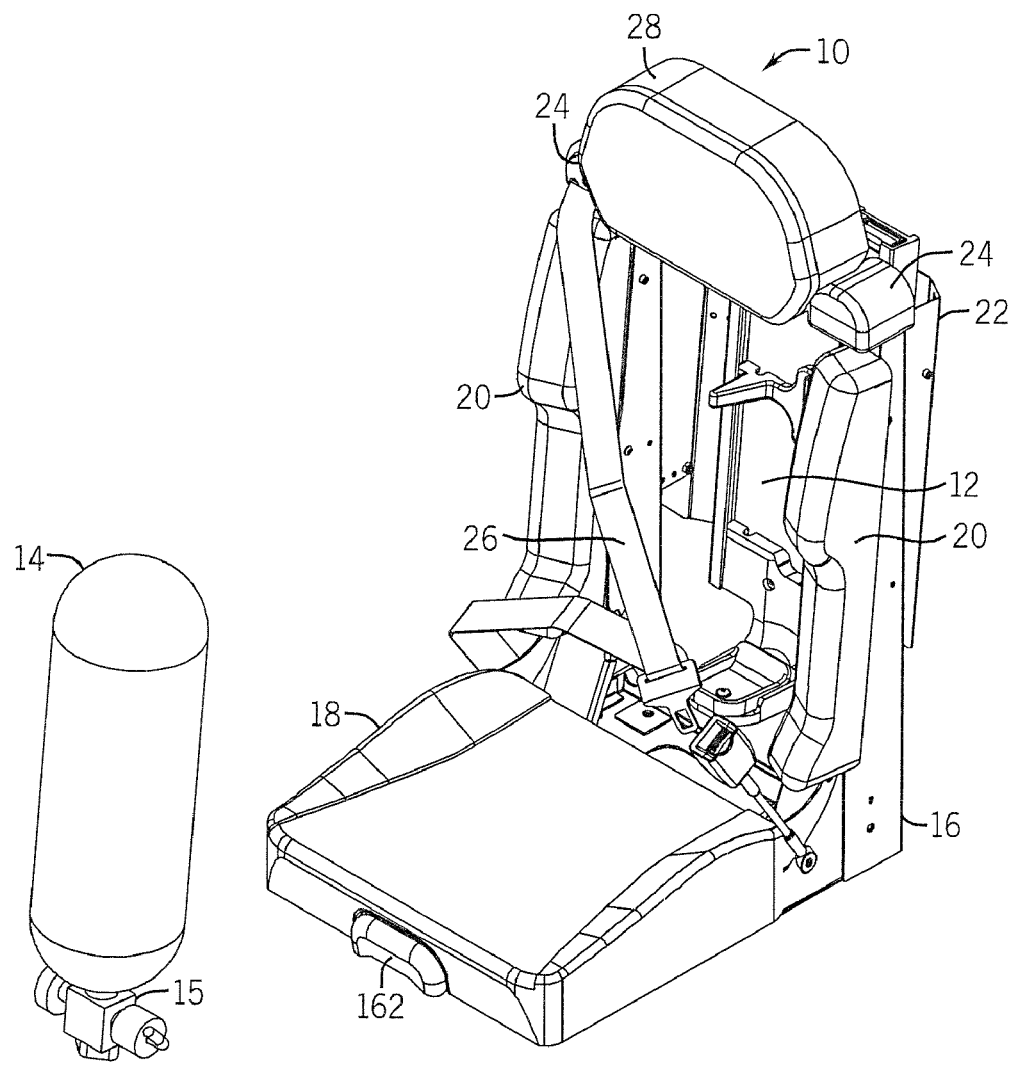
FIG. 1 is a perspective view of an emergency vehicle seat equipped with an SCBA mounting bracket assembly embodying the present invention.

Referring to the drawings, FIG. 1 illustrates an emergency vehicle seat 10 which has particular utility in fire and rescue vehicles. The seat 10 has a rear cavity that is equipped with a mounting bracket assembly 12 used to releasably hold a self-contained breathing apparatus (SCBA) generally in the form of a cylindrical pressurized oxygen tank 14. Typically, the tank 14 is connected to a harness worn by a firefighter or the like positioned in the seat 10, and is held by the mounting bracket assembly 12 in an inverted position such that a regulator portion 15 is supported at the bottom of the mounting bracket assembly 12. A domed end of the tank 14 and the regulator portion 15 define opposite extensions ends of the tank 14.

The seat 10 includes a frame for supporting a seat cushion 18 and a removable back engaging side cushion arrangement 20. The frame 16 supports a shroud 22 to which the mounting bracket assembly 12 is attached, and a pair of seatbelt cages 24, one of which is engaged with a seatbelt structure 26 integrated into the seat 10. A head pad 28 is pivotally biased to a head supporting position between the seatbelt cages 24.

Referring to FIGS. 2-5, the SCBA mounting bracket assembly 12 is generally comprised of a mounting plate 30, a clamping arrangement 32, a guide 34 and a support structure 36.

The mounting plate 30 functions to anchor the mounting bracket assembly 12 to a support surface such as the rear portion of seat 10. The mounting bracket 30 is a rigid, extruded metallic construction having a flat, rectangular base 38 integrally formed with a pair of elongated side channels 40 for slidably receiving the clamping arrangement 32, the guide 34 and the support structure 36. The mounting plate 30 normally has a length commensurate with the seat 10 in which it is installed. However, the length may vary depending upon the particular application. The base 38 is formed with a first set of holes 42 which receive fasteners for securing the base 38 to the seat shroud 22. Alternatively, the base 38 could be secured to a different support structure, such as for example, a wall. The base 38 is also formed with a second set of holes 43 for enabling adjustable attachment of guide 34. The base 38 is further formed with a third set of holes 44 to facilitate adjustable attachment of support structure 36. The channels 40 are provided with a pair of aligned apertures (one being seen at 46) which are used in the adjustable securement of clamping arrangement 32.

The clamping arrangement 32 serves to automatically and lockingly engage and disengage with the inverted, domed bottom end of the tank 14. The clamping arrangement 32 includes a slide carriage 48, a pivot arm 50 and a clamp 52.

The slide carriage 48 has a backing plate 54 with an upper edge 56, a lower edge 58 and a pair of side edges 60, 61. A coil spring 62 is attached to the circled area 63 on backing plate 54. The upper edge 56 carries a pair of aligned tubular receivers 64 which are spaced apart by a recess 66. The side edges 60, 61 have a pair of upper stops 68 and a pair of lower stops 70 projecting forwardly therefrom. An elongated latch support strip 72 having a mounting ear 74 is attached by fastener 76 on a lower right-hand corner of the backing plate 54. The support strip 72 depends downwardly beneath the backing plate 54 and is provided on its lower end with a guide opening 78. A latching mechanism 80 is secured by fasteners 82 to the mounting ear 74.

The latching mechanism 80 is a single stage mini rotary lock commercially available from The Eastern Company of Cleveland, Ohio, and described in detail in U.S. Pat. Nos. 5,884,948 and 6,471,260 which are herein incorporated by reference. As is well known, the latching mechanism 80 includes a rotary jaw biased by a torsion spring away from a latched position towards an unlatched position, and a rotary pawl that is biased by the same or a separate torsion coil spring away from a jaw releasing position to a jaw retaining position. The latching mechanism 80 further includes an operating arm 84 coupled to the rotary pawl, and a U-shaped notch 86 which receives a cylindrical pin 88 on pivot arm 50. An upper end of a cable 89 passes through guide opening 78 and is fixed to operating arm 84 on latch mechanism 80.

The pivot arm 50 has a vertical portion 90, an angled portion 92 and a horizontal portion 94 and is formed with a pair of horizontally aligned holes 96 and a set of vertically extending holes 98 on opposite sides of the horizontal portion 94. The pivot arm 50 is designed such that its vertical portion 90 is positioned against the spring 62 in the recess 66 of backing plate 54 with the holes 96 in registration with the passageways 100 formed in the receivers 64 and the upper stops 68. A pivot pin 102 is passed through the holes 96, and passageways 100 and fixed in position so that the pivot arm 50 is pivotally mounted at the top of slide carriage 48. As will be appreciated hereafter, pivot arm 50 is pivoted between a latched position and an unlatched position wherein cylindrical pin 88 is engageable and disengageable with latching mechanism 80.

The clamp 52 has a semi-rounded or curved cap 104 having a flat top end 106 provided with a pair of openings 108 which are aligned with any pair of holes 98 on pivot arm 50. The underside of cap 104 is configured to help center the domed end of tank 14, and may be padded, if desired, to protect the tank 14. The clamp 52 further has a rear end 110 that slidably receives the horizontal portion 94 of pivot arm 50. The clamp 52 is secured to the pivot arm 50 by using fasteners 112 which pass through the aligned openings 108 and holes 98. The clamp 52 is adjustably positioned fore and aft on the horizontal portion 94 of pivot arm 50 by sliding the clamp 52 to the desired position on the horizontal portion 94 of the pivot arm 50 and inserting the fasteners 112 in the aligned holes 98 and openings 108. This adjustment feature provides for clamping tanks 14 of differing diameters.

The clamping arrangement 32 is installed relative to the mounting plate 30 by sliding the side edges 60, 61 of the backing plate 54 into the top of the channels 40. The holes 46 in channels 40 are aligned between the upper and lower stops 68, 70 on the backing plate 54. A pair of screws 114 is passed through the washers 116 and the holes 46, and then secured in a pair of adjustment nuts 118 positioned on the inside of the channels 40. By means of the screws 114 and the adjustment nuts 118, the clamping arrangement 32 can be adjustably mounted upwardly and downwardly on the mounting plate 30 over a range of vertical travel defined by the length between the upper and lower stops 68, 70 on the backing plate 54. The mounting bracket 10 is therefore able to accommodate tanks 14 of varying lengths.

The guide 34 functions in an adjustable manner to center and hold an intermediate portion of the tank 14 during ingress and egress relative to the mounting bracket assembly 12. The guide 34 is a bifurcated or forked construction provided with an elongated center section 120 integral with a pair of spaced apart tank retaining arms 122 having lateral extensions 124. The center section 120 is formed with a vertically extending slot 126 that is aligned with the pair of holes 43 provided in the base 38. The guide 34 is installed by sliding the extensions 124 into the channels 40, such as from the bottom thereof, until the slot 126 is aligned with the holes 43. Then, a pair of screws 130 is passed through the slot 126 and screwed into tapped walls of the holes 43. By loosening and tightening the screws 130, the guide 34 can be vertically adjusted on the base 38 so as to clear any tank hardware while providing an additional support for the tank 14.

The support structure 36 acts to fully and adjustably support the inverted top or regulator portion 15 of the tank 14. The support structure 36 includes a foot 132, a foot support 134 and an adjustable cradle 136.

The foot 132 is typically comprised of a plastic material and has an upper section 138 and a lower section 140. The upper section 138 has side edges 142 and is formed with a pair of holes 144 which are designed to be aligned with either an upper or lower set of holes 44 in the base 38. The lower section 140 has side edges 146 and is formed with several openings 148. The foot 132 is reinforced by the foot support 134 which conforms along the rear and bottom edges of the foot 132. The foot support 134 has a pair of openings 150 at its top end and a single aperture 152 on a bottom surface. The cradle 136 has an angled wall 154 and has a hole 156 in its bottom surface. A screw 158 is passed through the hole 156, one of the several holes 148 and aperture 152 to partially join the foot 132, the foot support 134 and the cradle 136 together. FIG. 5 illustrates that the cradle 136 can be reversibly mounted on the foot 132 to suit the particular regulator portion 15 on a tank 14. It should also be understood that the fore and aft positions of the cradle 136 can be adjusted for the particular tank 14 by using the appropriate openings 148 on the lower section 140 of the foot 132.

The side edges 142 of the foot 132 are slidably received from the bottom of the channels 40 until either pair of holes 144 are aligned with the openings 150 on foot support 134 and holes 144 on foot 132. Then, a pair of screws 160 is passed through the holes 144 and openings 150 and screwed into the holes 44 in base 38 to hold the support structure 36 at a high or low setting to accommodate the height of the tank 14. The screws 160 can be loosened to change the setting of the support structure 36 as desired.

Figure 4:
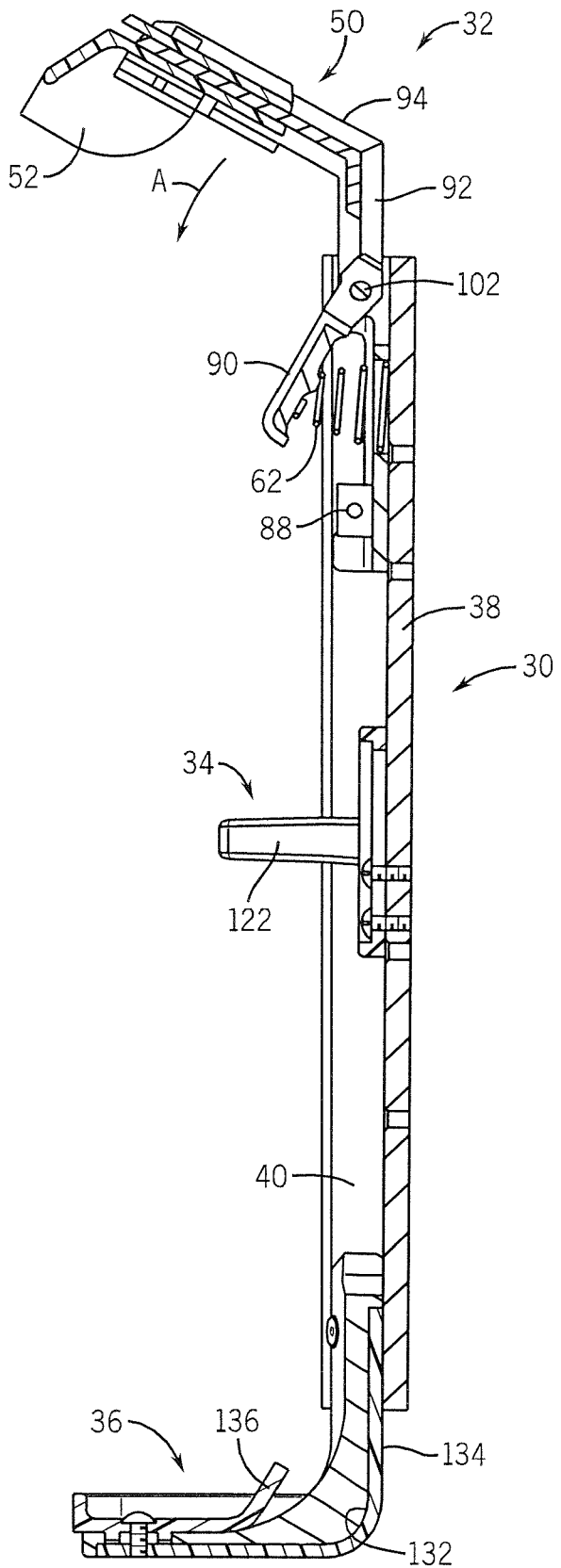
FIGS. 4 and 4A are longitudinal sectional views of FIG. 2 showing the mounting bracket assembly in respective unlatched and latched positions.

With the mounting bracket assembly 12 assembled as described above and installed in the seat 10 as shown in FIG. 1, the pivot arm 50 has its pin 88 disengaged from the latching mechanism 80, and the clamping arrangement 32 assumes the unlatched position shown in FIG. 4. In this position, the coil spring 62 forces the pivot arm 50 to pivot about pin 102 so that the lower portion 90 extends forwardly of backing plate 54, the angled portion 92 extends vertically and the clamp 52 is swung upwardly above the mounting plate 30.

The lower portion 90 of pivot arm 50 defines an actuator plate adapted to abut a tank 14 as it is moved rearwardly towards the base 38. As the tank 14 first contacts actuator plate 90, it will cause the pivot arm 50 to swing downwardly in the direction of arrow A in FIG. 4. At the same time, the intermediate portion of tank 14 is engaged between the retaining arms 122 of the guide 34 and the regulator portion 15 of the tank 14 is moved into the cradle 136 on the support structure 36.

Figure 2:
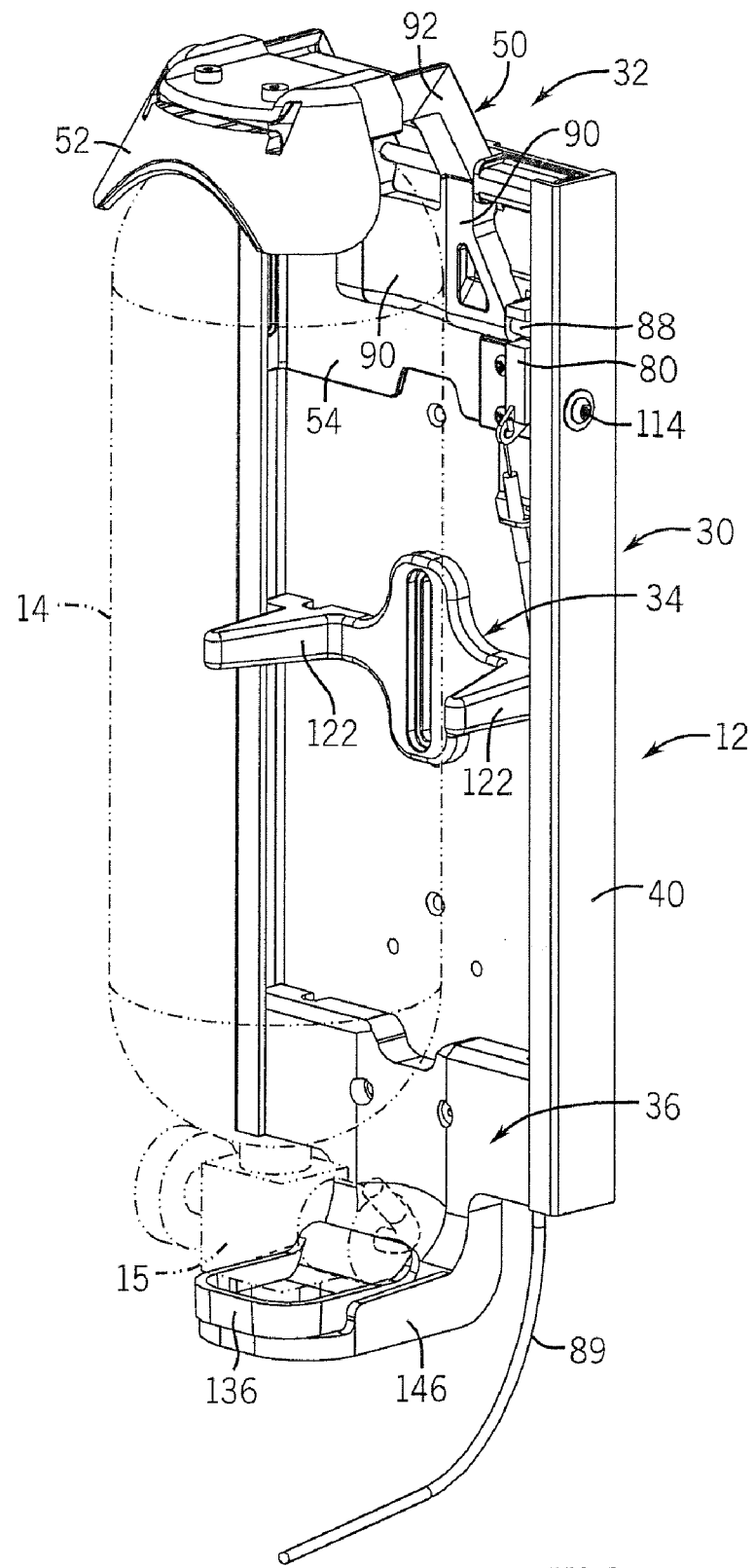
FIG. 2 is a perspective view of the SCBA mounting bracket assembly showing an oxygen tank (in phantom lines) as installed thereon.
Figure 3:
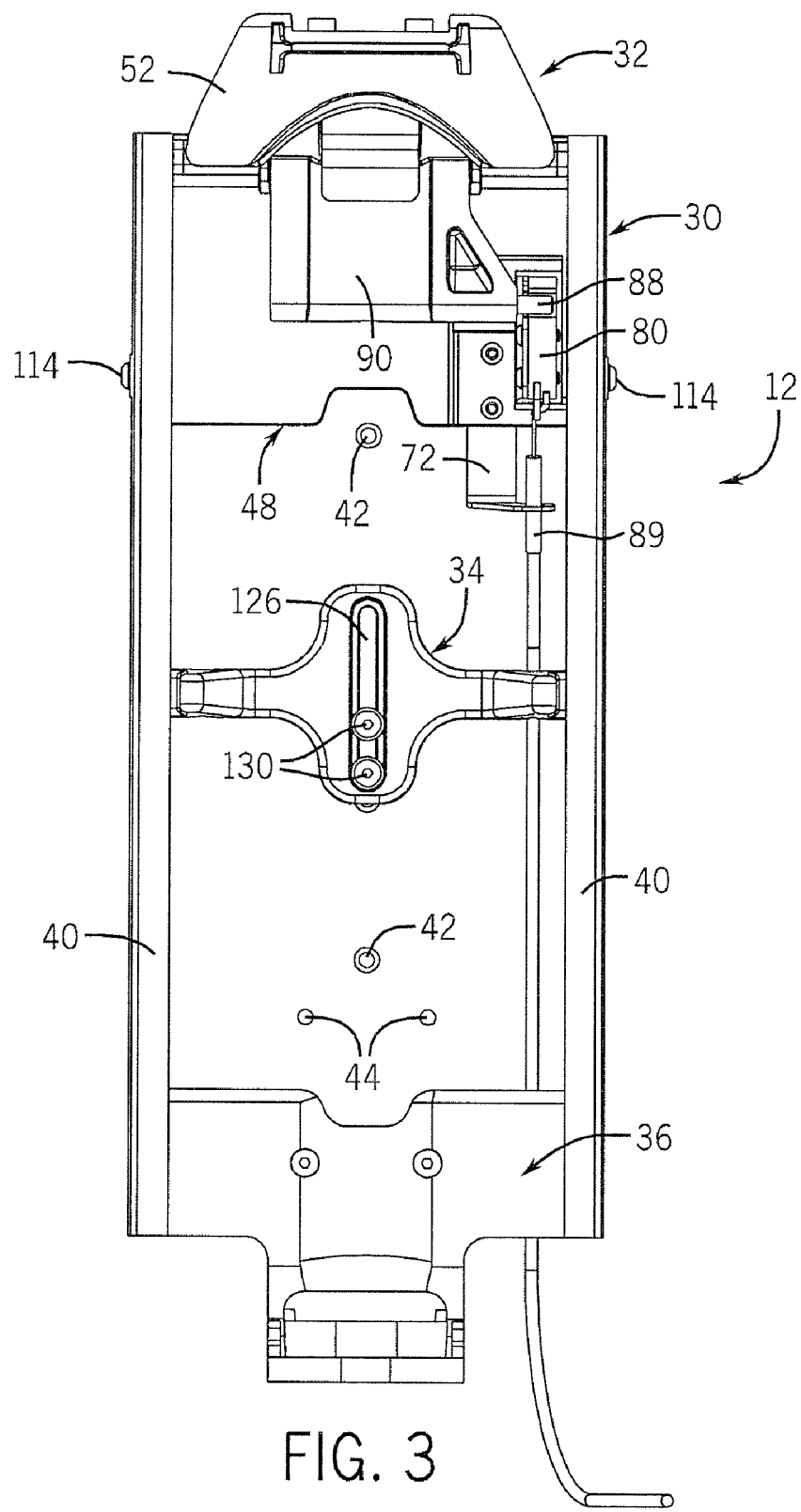
FIG. 3 is a front view of FIG. 2.
Figure 4A:
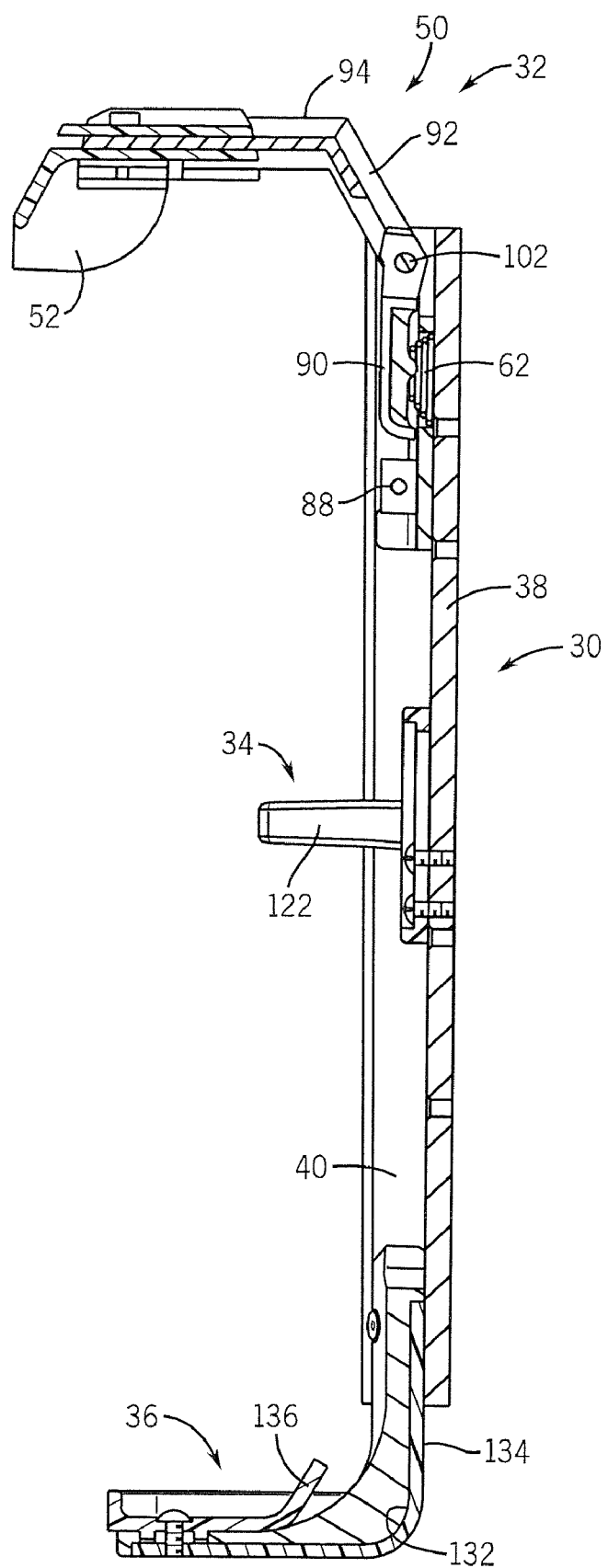

Continued rearward movement of tank 14 will cause the actuator plate 90 to compress spring 62 until the pin 88 enters the notch 86 and becomes locked in the latching mechanism 80 in a latching position shown in FIGS. 2 and 4A. In the latching position, the clamp 52 tightly locks against the inverted domed end of the tank 14 to positively secure opposite extreme ends of the tank 14 in the mounting bracket assembly 12.

The present invention thus provides an automatic tank locking function achievable exclusively by the rearward movement of the tank 14 against the actuator plate 90 of the clamping arrangement 32. The pivot arm 50 and the clamp 52 are pivoted about a horizontal axis defined by the pivot pin 102 as the clamping arrangement 32 moves between the unlatched and latched positions. There is no need to use any hands to secure the tank 14 which makes securement fast, efficient and convenient.

Figure 10:
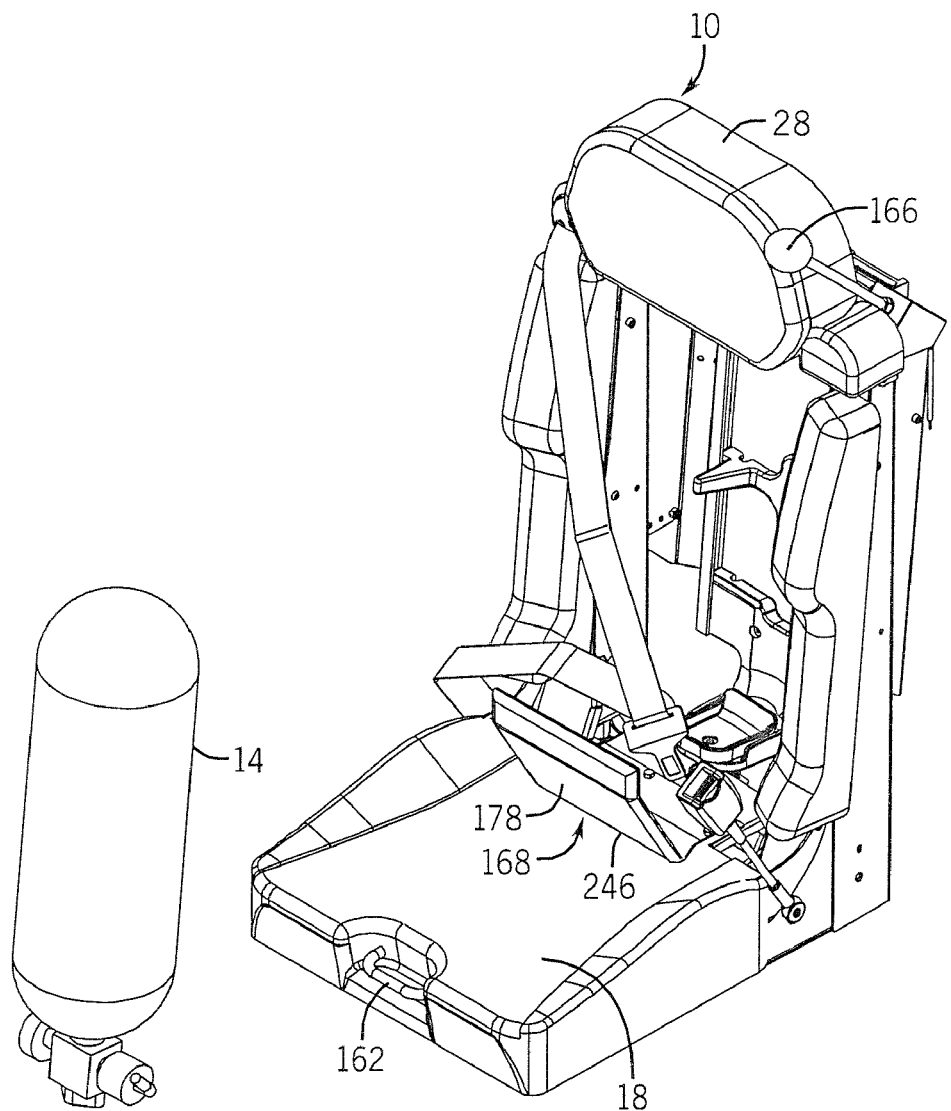
FIG. 10 is a view similar to FIG. 1 showing the spring-loaded back pad assembly of FIG. 8 installed in the vehicle seat.
Figure 11:
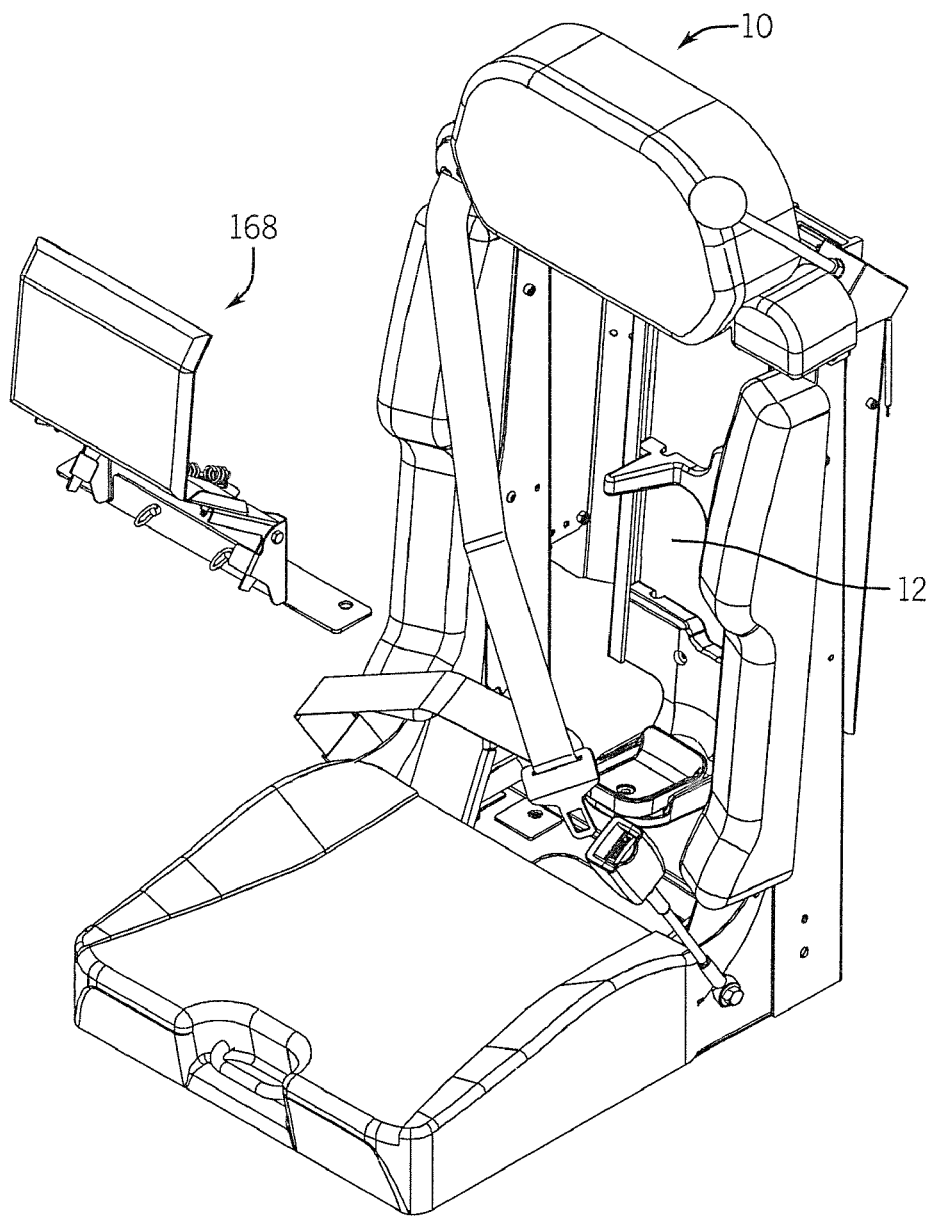
FIG. 11 is a view similar to FIG. 10 showing the spring-loaded back pad assembly removed from the vehicle seat.

When it is desired to release the tank 14 from the mounting bracket assembly 12, the cable 89 can be pulled to unlock the latching mechanism 80, enabling the spring 62 to force the pivot arm 50 and clamp 52 to swing upwardly to the unlatched position. In FIG. 1, the outer end of the cable 89 opposite the latching mechanism 80 is attached to a release handle 162 at the front of the seat cushion 18 as shown at FIG. 1. The cable 89 can be routed through grooves 164 formed in the rear portions of guide 34 and foot 132. Movement of the handle 162 will cause the cable 89 to release the latch mechanism 80. It should be understood, however, that the outer end of the cable 89 may be affixed to a release mechanism elsewhere on the seat cushion 18 or seat 10 or may be directed over the shoulder of an occupant of seat 10. The latching mechanism 80 may also be released remotely in other ways. Multiple cables 89 may extend from the latching mechanism 80 to enable a seat occupant to release the tank 14 from multiple locations. For example, FIG. 10 shows the combination of the release handle 162 on seat 10 and a second release handle 166 adjacent the head pad 28 so that the seat occupant can release the latching mechanism 80 from the lower portion of seat 10 or from over the shoulder of the seat occupant.

Operation of the mounting bracket assembly 12 is further facilitated by the adjustability of the clamping arrangement 32, the guide 34 and the support structure 36 in the channels 40 of the mounting plate assembly. In addition, the clamp 32 is adjustable on pivot arm 50 and the cradle 136 is reversibly mounted to suit the particular tank structure.

Figure 6:
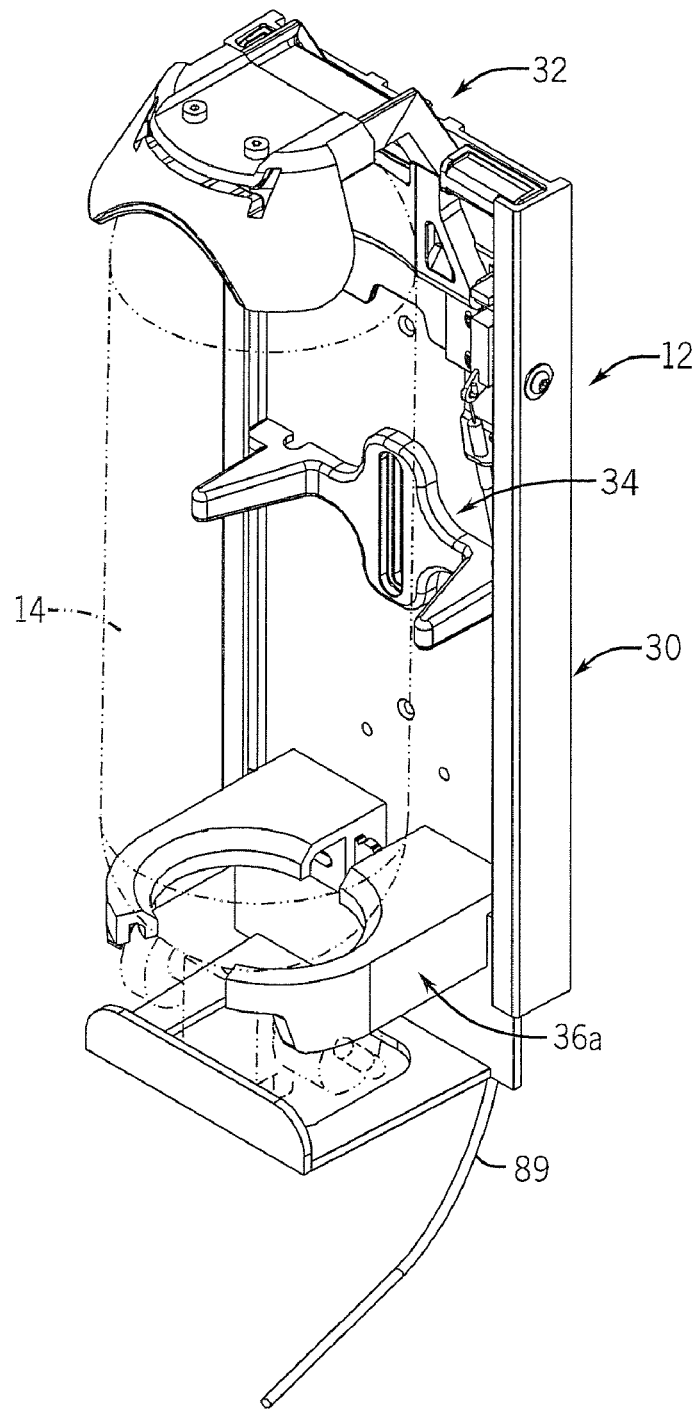
FIG. 6 is a perspective view of a first alternative embodiment of FIG. 2.
Figure 7:
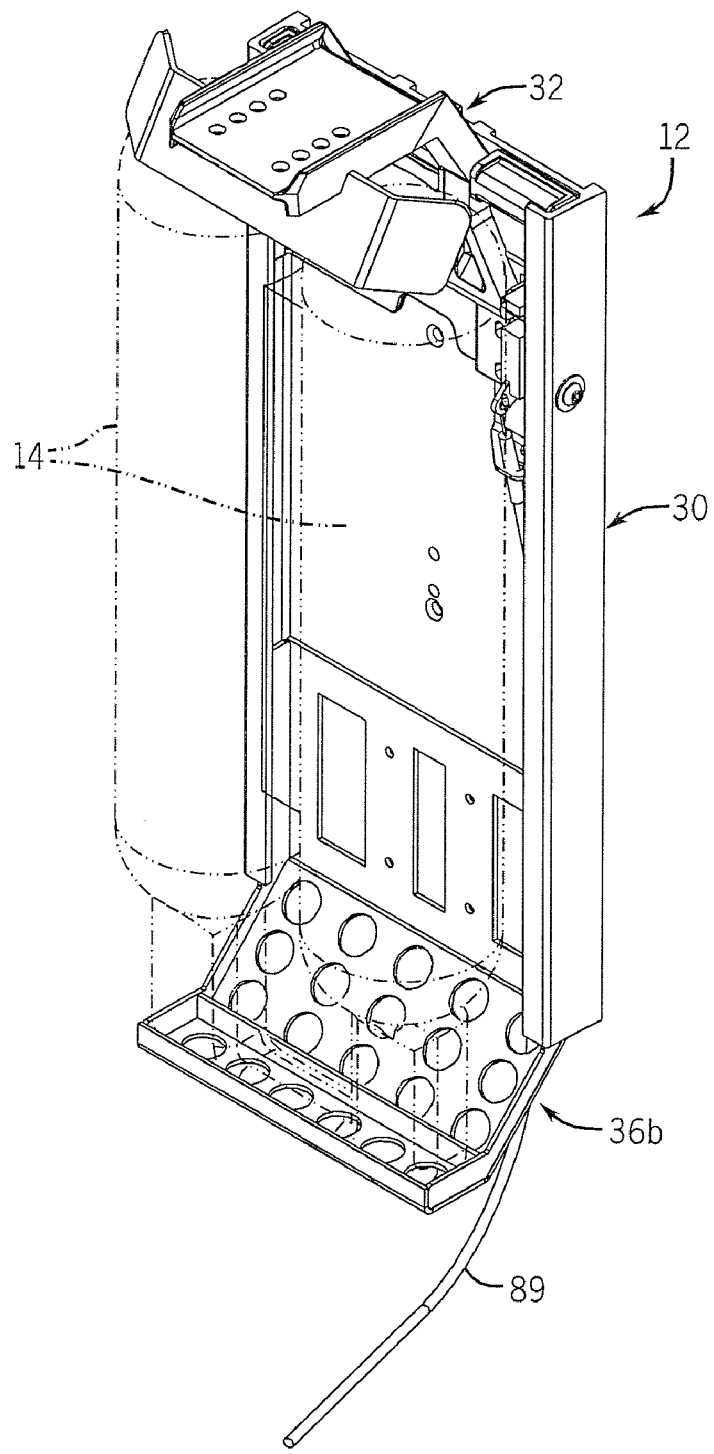
FIG. 7 is a perspective view of a second alternative embodiment of FIG. 2.

The mounting bracket assembly 12 contemplates alternative embodiments for accommodating different tank structures. FIG. 6 illustrates an alternative two-piece support structure 36a used to support European-style tanks 14. FIG. 7 shows a further alternative support structure 36b used to support a twin pack or two side-by-side tanks.

The present invention also includes a spring-loaded back pad assembly 168 (FIGS. 8-13) that is placed into the rear cavity of the emergency vehicle seat 10, and can be used to support the back of the seat occupant. The back pad assembly 168 is particularly versatile because it can be used with or without the tank 14 in the mounting bracket assembly 10. Prior art back pads are known to be used only without the tank 14 in place.

The back pad assembly 168 is comprised of a mounting bracket 170, a lower pivot bracket 172, an upper pivot bracket 174, a pad support plate 176 and a covered, cushioned back pad 178.

The mounting bracket 170 has a flat horizontal base 180 integrally joined to a substantially vertical wall 182. The base 180 is provided with a pair of spaced apart holes 184 and the wall 182 is also provided with a pair of spaced openings 186. The wall 182 is also formed with a vertical slot 185. The mounting bracket 170 is affixed to the seat 10 by passing threaded bolts 187 (FIG. 12) through washers 188, the holes 184 and holes in the seat frame 16, and then attaching nuts 189 on the bolts 187.

The lower pivot bracket 172 has a main wall 190 formed with a pair of spaced apart openings 192 and a projecting portion 194 having a recess 196 and a small retaining opening 198. A pair of side walls 200 extend integrally from main wall 190 with each side wall 200 having a pivot aperture 202 formed in the upper end thereof. The side walls 200 are formed with inwardly extending stop portions 204.

The upper pivot bracket 174 has a main plate 206 configured with a set of holes 208, a retaining aperture 210, and a recess 212. The main plate 206 has a pair of depending side arms 214 formed with pivot apertures 216. Side arms 214 are positioned inside side walls 200 of lower pivot bracket 172 so that pivot apertures 202 and 216 are aligned. Upper pivot bracket 174 is pivotally attached to lower pivot bracket 172 by passing threaded screws 218 through the aligned apertures 202 and 216 and threading nuts 220 on the screws 218. A coil extension spring 222 has one end 224 held in retaining opening 198 on lower pivot bracket 172, and an opposite end 226 maintained in retaining aperture 210 on upper pivot bracket 174. End portions of the spring 222 lie in the recesses 196 and 212 formed on the respective pivot brackets 172, 174.

The pad support plate 176 includes a base plate 228 and an angled support wall 230 extending rigidly at a generally obtuse angle therefrom. The base plate 228 is formed with upstanding side edges 232 and a set of holes 234. The support wall 230 has an upwardly and outwardly extending portion 236 and a vertical portion 238 to which the covered, cushioned back pad 178 is secured for supportive engagement with a seat occupant's lower back. The pad support plate 176 with the attached back pad 178 is positioned so that the base plate 228 lies on top of main plate 206 and holes 208 and 234 are aligned. Pad support plate 176 and back pad 178 are fixed to upper pivot bracket 174 by passing threaded screws 240 through aligned holes 208, 234 and attaching nuts 242 on the screws 240.

Figure 8:
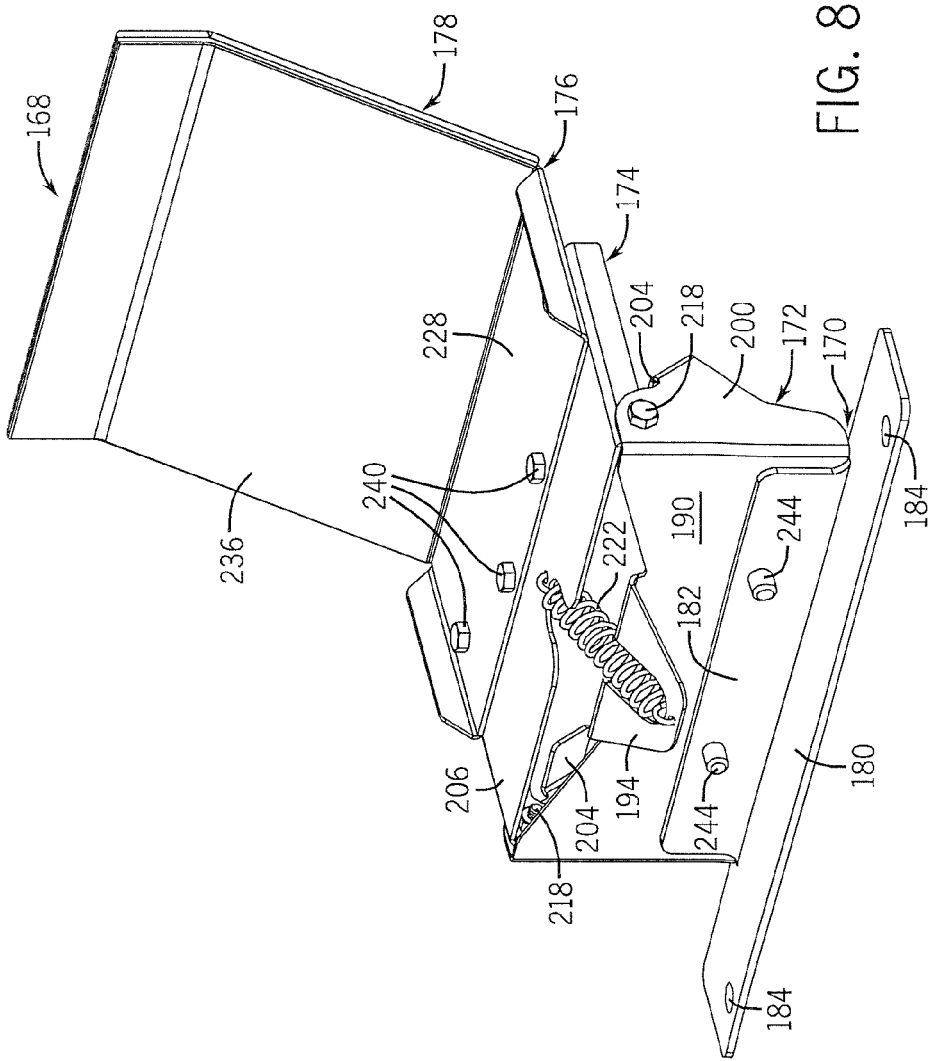
FIG. 8 is a reverse perspective view of an assembled, spring loaded back pad assembly.
Figure 9:
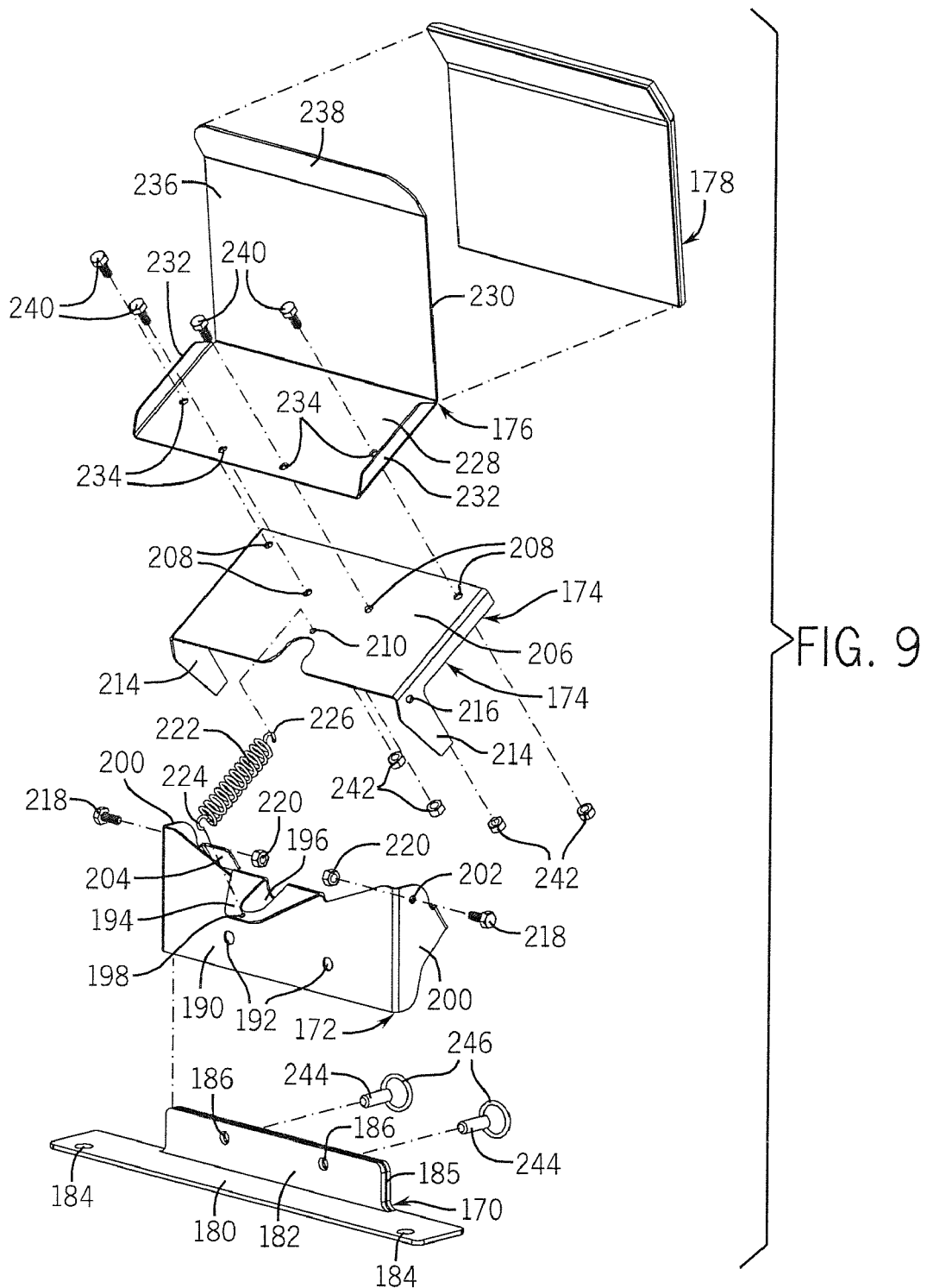
FIG. 9 is an exploded view of FIG. 8.
Figure 12:
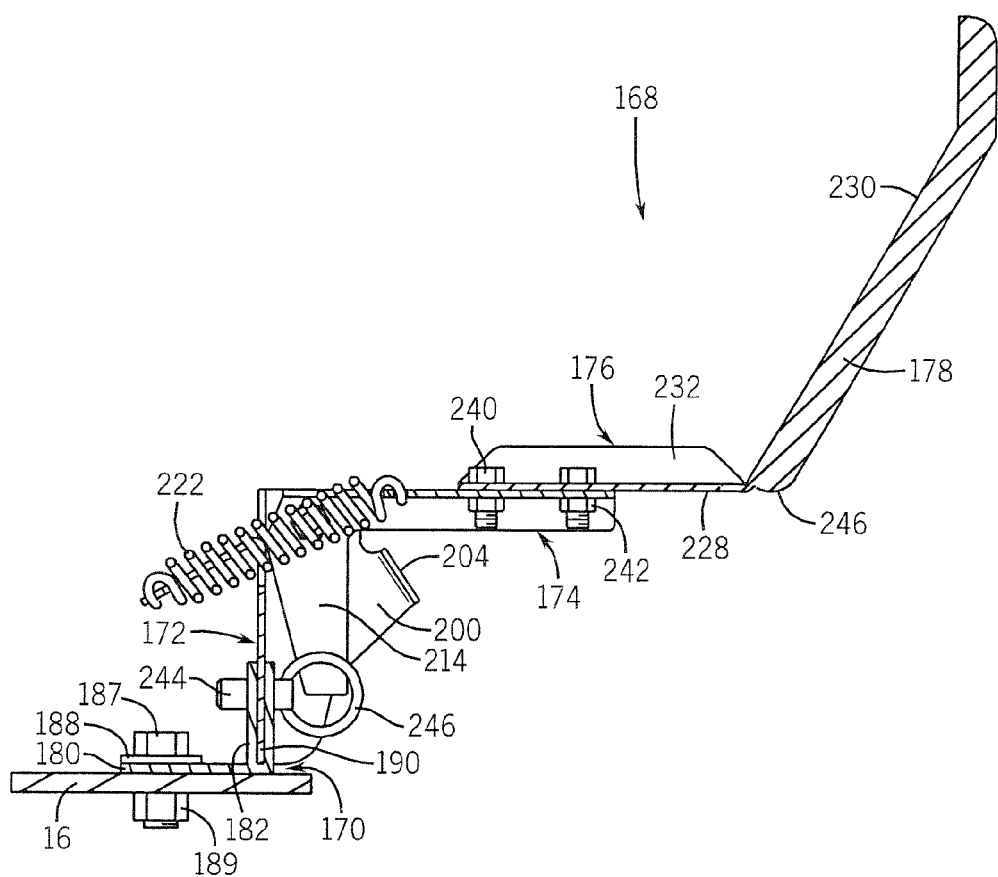
FIG. 12 is an elevational view of the spring-loaded back pad assembly attached to the seat frame and shown in a folded down position.
Figure 13:
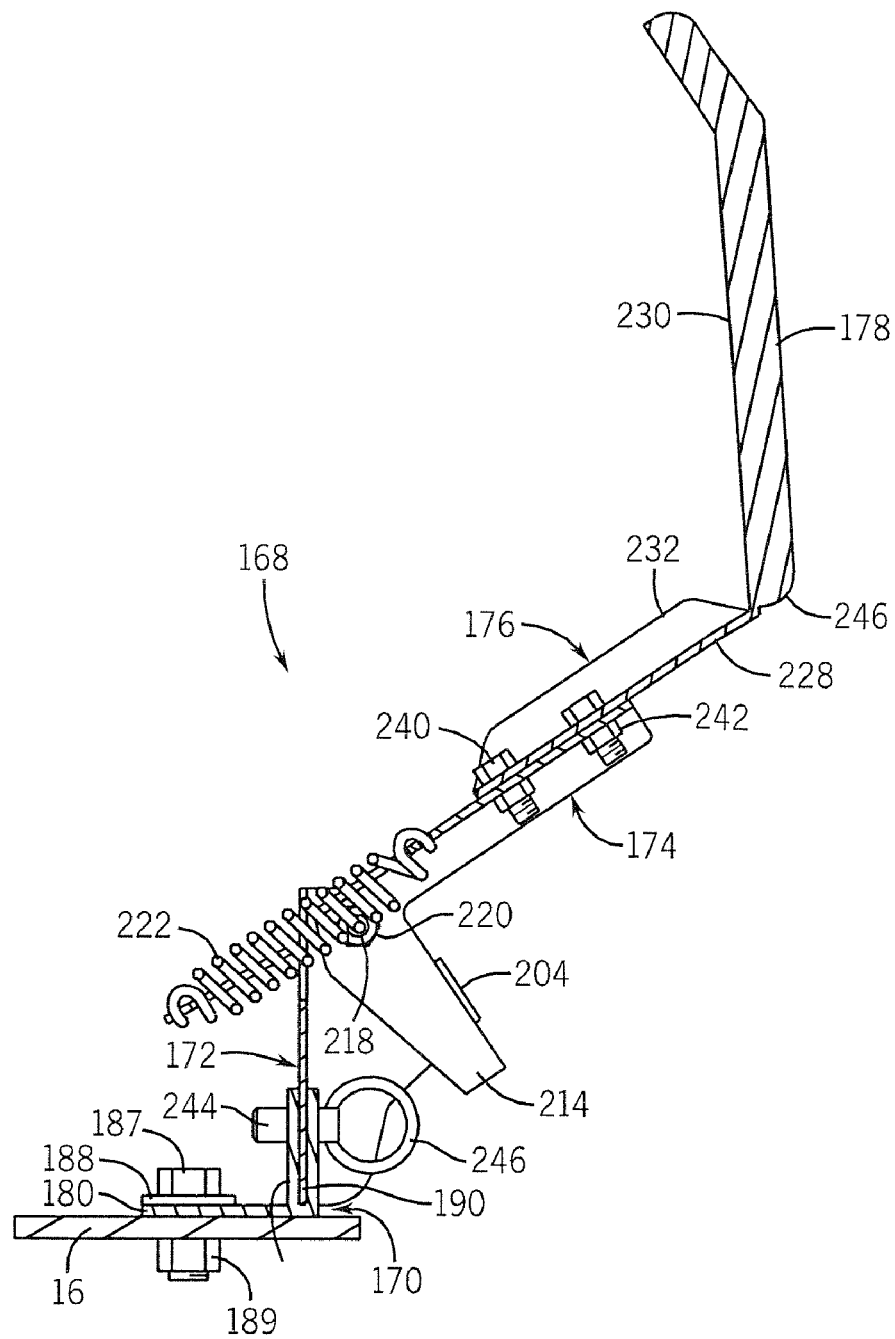
FIG. 13 is a view like FIG. 12 showing the spring-loaded back pad assembly in a folded up position.

Upper pivot bracket 174, pad support plate 176 and back pad 178 are pivotally connected to lower support bracket 172, and form a subassembly that can be removably secured to the mounting bracket 170. This is accomplished by inserting main wall 190 in slot 185 of wall 182, aligning openings 192 on lower support bracket 172 with the openings 186 on mounting bracket 170 and passing a pair of removable pull pins 244 through the aligned openings 186, 192 as shown in FIGS. 8, 12 and 13. Preferably, the pull pins 244 have finger rings 246 and well-known spring detent constructions which will normally hold the components 172, 174, 176, 178 on mounting bracket 170, but will facilitate a relatively simple removal of the components 172, 174, 176, 178, if desired, while the mounting bracket 170 remains attached to the seat frame 16.

In use, the spring-loaded back pad assembly 168 is positioned on the seat frame 16 between the mounting bracket assembly 12 and the lower back of a seat occupant. The back pad assembly 168 features an over the center spring arrangement formed by the components 170, 172, 174, 176, 178 and spring 222 so that the back pad assembly 168 is manually moved and retained in a folded down position (FIGS. 10 and 12) or a folded up position (FIG. 13). Spring 222 biases the pivoting components 174, 176 and 178 downwardly or upwardly relative to components 170 and 172 depending upon the relative location of the components 174, 176 and 178. In the folded down position shown in FIGS. 10 and 12, the lower end 246 of pad 178 is biased downwardly and held by the spring 222 against the seat cushion 18. When the pad 178 is pivoted upwardly to a certain critical point, the over the center spring arrangement will forcefully flip the pad 178 to the folded upper position shown in FIG. 13, which final position is defined by the engagement of the side arms 214 against the stop portions 204.

If there is no tank 14 in the mounting bracket assembly 12, the back pad assembly 168 acts as a seat back in the folded up position to support the lower back of the seat occupant for comfort and safety. If there is a tank 14 in the mounting bracket assembly 12, the back pad assembly 168 still acts on the seat occupant's back to offer additional support. When the tank 14 is removed from the mounting bracket assembly 12, the back pad assembly 168 is easily swung downwardly and folds against the seat cushion 18 to allow egress of the tank 14. The back pad assembly 168 remains spring biased against the seat cushion 18 until moved to the folded up position.

The back pad assembly 168 is particularly novel and versatile because it can be used with or without the tank 10 installed on the mounting bracket assembly 12 unlike prior art back pad designs.

Referring now to FIGS. 14-18, the mounting bracket assembly 12 is substantially as described herein, but is modified to include a camming arrangement 248 for conveniently adjusting the vertical position of the clamping arrangement 32 relative to the mounting plate 30 so as to accommodate tanks 14 of different lengths. In addition, the mounting bracket assembly 12, when installed in a vehicle, is modified to include a powered latching or lock out arrangement 250 operable to release a tank from the mounting bracket assembly 12 in response to a parked condition of the vehicle in combination with actuation of a control arrangement 252 (FIG. 18) connected to the powered latching mechanism 250.

More specifically, the camming arrangement 248 includes a cam member 254 which is attached, such as by fasteners, to an adjustment lever 256 having a tab 258 extending from a front portion thereof. The cam member 254 is eccentrically mounted for rotation with pivot pin 102 on one end thereof that extends beyond the tubular receiver 64 on the right side of the slide carriage 48. The pivot pin 102 also passes through a coil spring 260 located between the outermost end of the aforementioned tubular receiver 64 and the adjustment lever 256. The spring 260 has one leg (not shown) biased against the slide carriage 48, and another leg 262 biased upon the adjustment lever 256. The spring 260 sits beneath a pin 264 (FIG. 15) that protrudes inwardly from the cam member 254. The pivot 102 further passes through a coil spring 266 which replaces the spring 62 and serves to normally bias the clamping arrangement 32 in the unlatched position upwardly as previously described. The camming arrangement 248 is located between the mounting plate 30 and the clamping arrangement 32.

Figure 15:
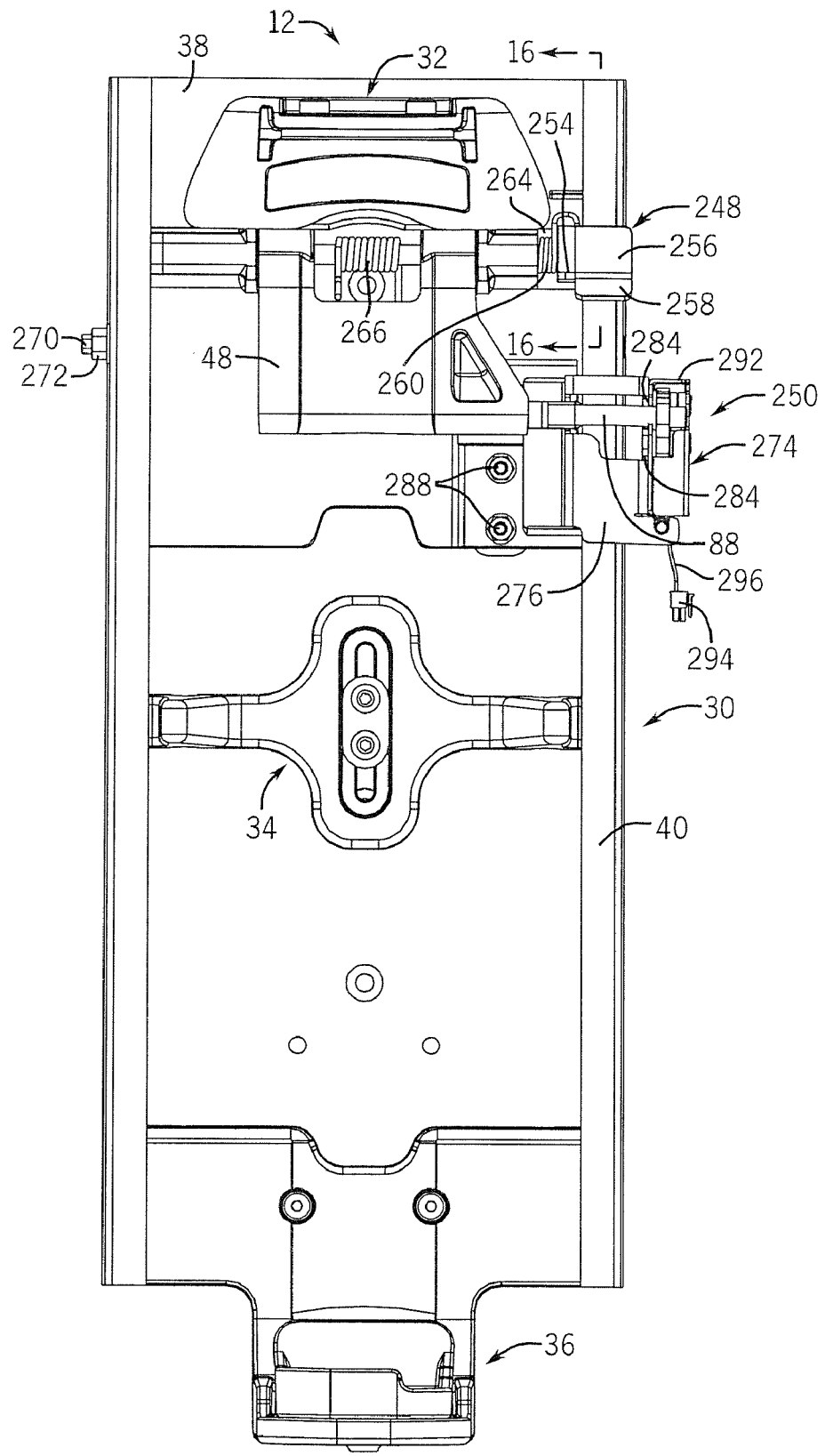
FIG. 15 is a front view of FIG. 14.
Figure 16:
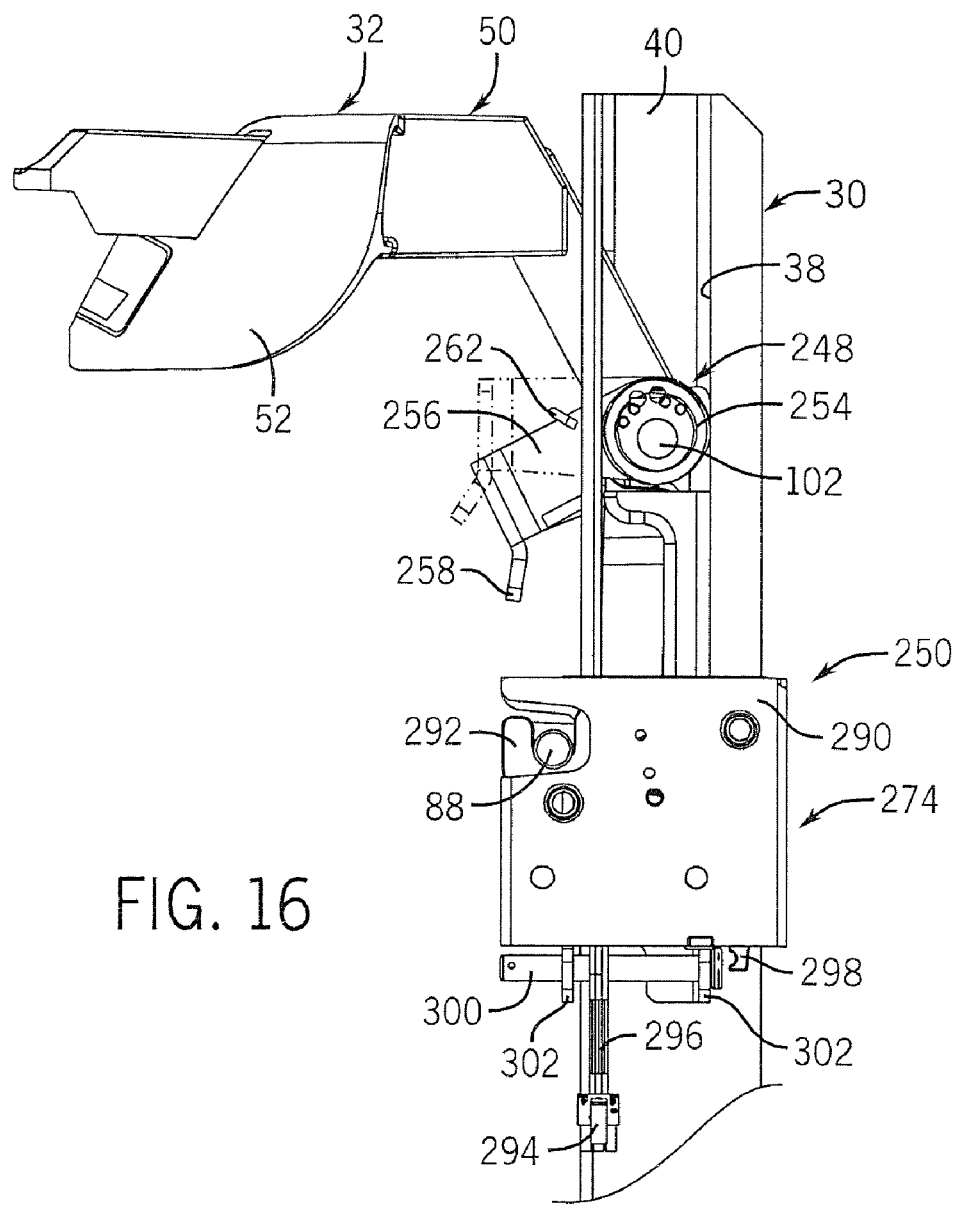
FIG. 16 is a partial side view and a sectional view taken on line 16-16 of FIG. 15.
Figure 17:
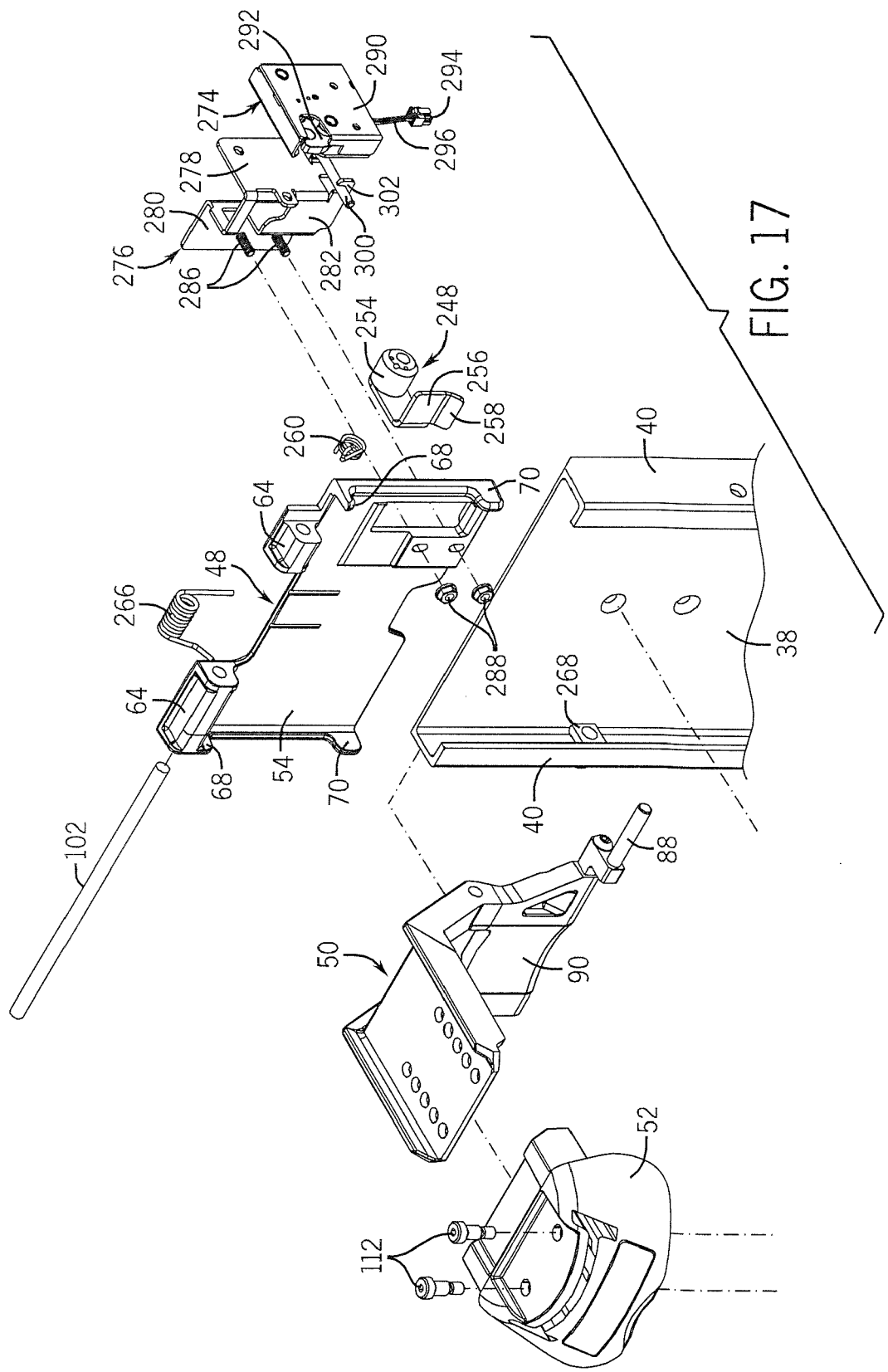
FIG. 17 is an exploded view of an upper portion of FIG. 14.

In use, the clamping arrangement 32 is adjustably mounted for slidable movement upwardly and downwardly along the mounting plate 30 over a range of vertical travel defined by the upper and lower stops 68, 70 on backing plate 54. The stops 68, 70 are engageable with a nut assembly 268 (FIG. 17) having a threaded shaft 270 which passes through the left side channel 40 and receives a nut 272 (FIG. 15). Normally, the cam member 254 is biased by the spring 260 into engagement with the base 38 to prevent sliding movement of the clamping arrangement 32 (including the slide carriage 48 and the pivot arm 50) relative to the base 38, as depicted in FIG. 16.

When it is desired to permit vertical adjustment of the position of the clamping arrangement 32, the tab 258 on adjustment lever 256 is pushed upwardly against the bias of spring 260 (as shown in phantom lines in FIG. 16) to disengage cam member 254 from base 38. With upward pressure maintained on tab 258, the clamping arrangement 32 may be vertically adjusted as desired to accommodate different lengths of tanks used in the mounting bracket assembly 12. Release of the tab 258 allows the spring biased cam member 254 to re-engage base 38 and again lock the vertical position of the clamping arrangement 32.

The camming arrangement 248 enables a quick, convenient adjustment of the clamping arrangement 32 relative to the mounting plate 30. Such a vertical adjustment previously required loosening and tightening of screws 114 and nuts 118, adjustment of nuts on rods running longitudinally of the mounting bracket assembly or other less efficient adjustments.

FIGS. 14-18 also illustrate the powered latching or lock out arrangement 250 including an electric latching mechanism 274 secured to a latch bracket 276 that is joined to the clamping arrangement 32. As seen best in FIG. 17, the latch bracket 276 has an outer portion 278, an inner portion 280 and a mid-portion 282 connecting the outer and inner portions 278, 280. The electric latching mechanism 274 is connected to the outer portion 278 of bracket 276 by screws 284 (FIG. 15), and the inner portion 280 of bracket 276 is attached to a lower rear surface of the backing plate 54 using screws 286 and nuts 288. The mid-portion 282 of the bracket 276 extends laterally and rearwardly from the outer portion 278 to the inner portion 280. The bracket 276 is designed to mount the electric latching mechanism 274 such that the electric latching mechanism 274 and the bracket 276 will move freely along the mounting plate 30 with any vertical movement of the clamping arrangement 32.

Figure 14:
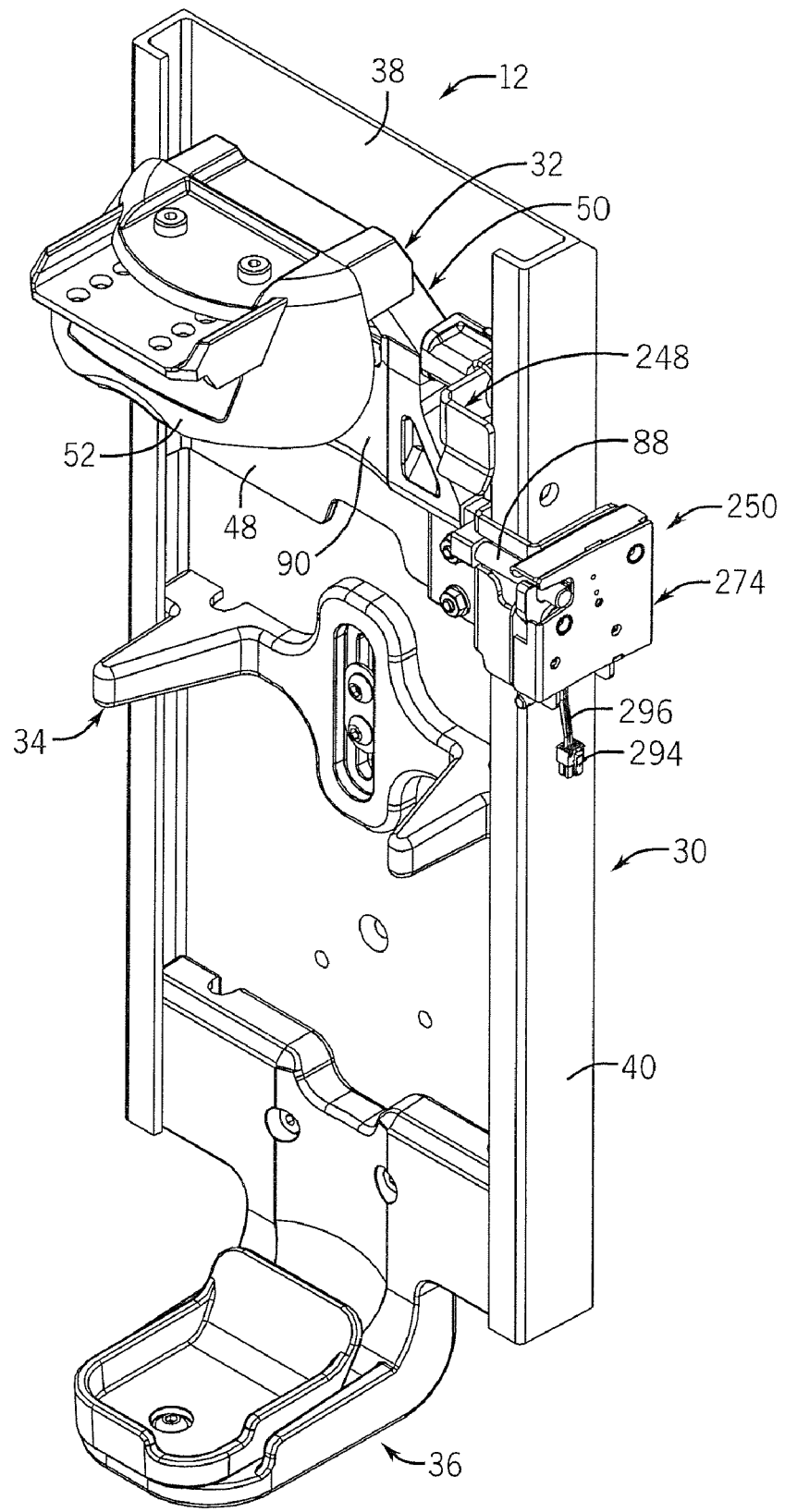
FIG. 14 is a perspective view of a mounting bracket assembly provided with a camming arrangement and a powered latching arrangement.

In the exemplary embodiment shown, the latching mechanism 274 is an electrically powered rotary pawl latch Part No. R4-EM-12-131 commercially available from Southco, Inc. of Concordville, Pa. This latch is described in detail in US Patent Application Publication No. 2009/0235767, published Sep. 24, 2009, which is herein incorporated by reference. As is disclosed in the '767 published application and seen in FIG. 16, the latching mechanism 274 includes a housing 290 and a spring biased pawl 292 pivotally attached within the housing 290 and movable between an open position and a closed position, the latter position being shown in the drawings. Inside the housing 290, a spring biased catch is movably mounted and engageable with the pawl 292 to effect latching, and upon energization, a motorized actuator assembly having a plunger selectively moves the catch out of engagement with the pawl 292 to effect unlatching. A connector 294 and wiring 296 are electrically connected to the actuator assembly and extend out of the bottom of the housing 290 as seen in FIGS. 14 and 16. A terminal portion 298 of the spring biased catch projects beneath the housing 290 and is selectively engageable with a headed plunger 300 which is slidably mounted on spaced apart hooks 302 extending downwardly from the bracket 276.

Figure 18:
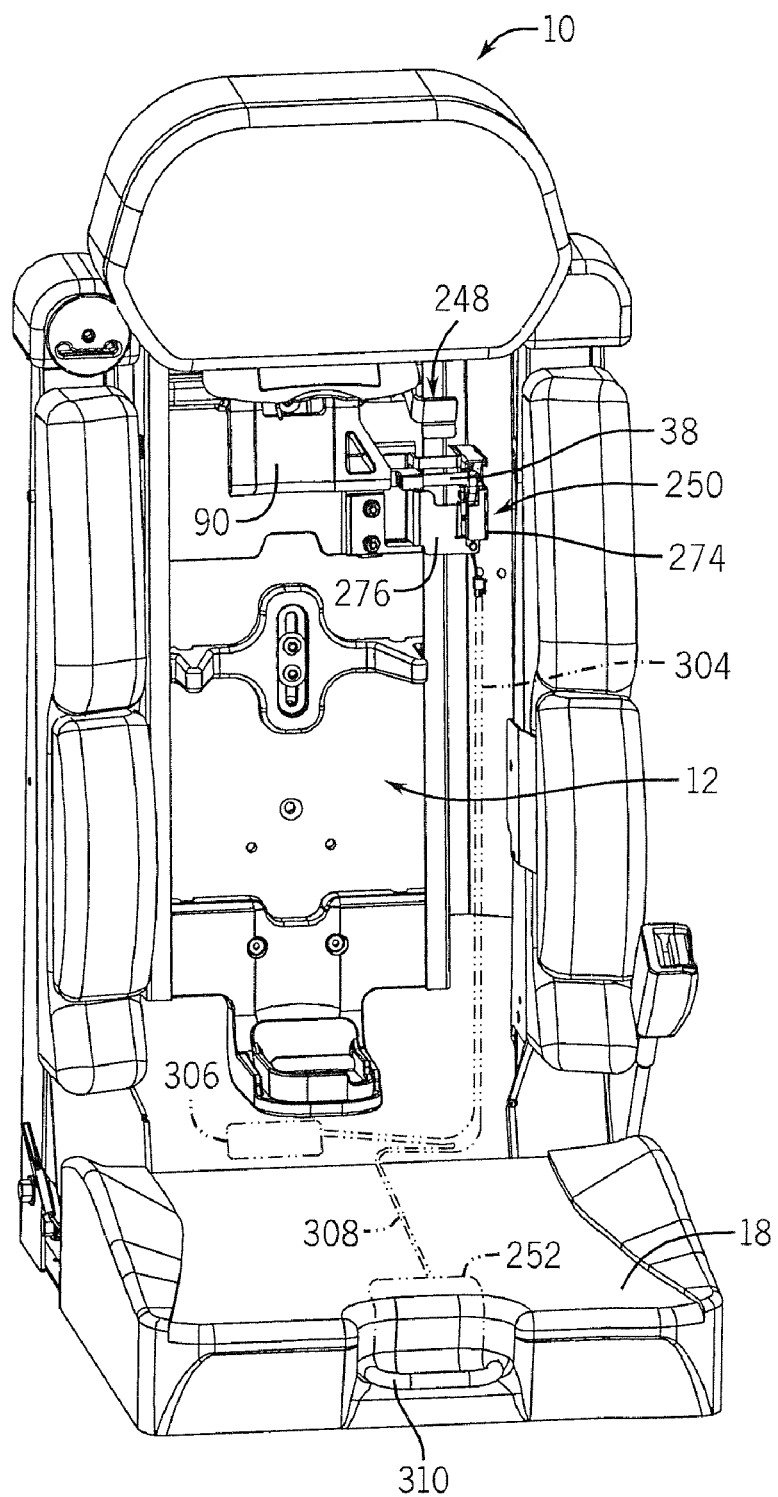
FIG. 18 is a perspective view of an emergency vehicle seat equipped with the mounting bracket assembly of FIG. 14.

As seen in FIG. 18, the wiring 296 extending from the electric latching mechanism 274 is typically connected to various portions of the vehicle to facilitate control. That is, the wiring 296 is operably connected by suitable wiring 304 to a parking brake switch 306 included in the electrical system of the vehicle. A unique aspect of the disclosure is the inclusion of the control arrangement 252 which is connected by suitable wiring 308 to the parking brake switch 306 for ultimately controlling the selective unlocking of the latching mechanism 274 and the movement of the clamping arrangement 32 from the latched position. The control arrangement 252 is shown in the example as a single switch mounted inside seat cushion 18 and turned on and off by moving a handle 310 at the front of a seat cushion 18. However, it should be understood that other switches may be included as part of the control arrangement 252 that are located elsewhere in the vehicle. The control arrangement 252 used with the latching mechanism 274 may be operated manually or alternatively by remote control.

In use, engagement of a tank against actuator plate 90 causes pivot arm 50 to swing downwardly until pin 88 enters a notch in pawl 292 and becomes mechanically locked in latching mechanism 274 in a latching position seen in FIGS. 14, 15, 16 and 18. In the latched position, the clamp 52 is engaged with an extreme end of the tank so that the tank is positively secured in the mounting bracket assembly 12. The latched position is maintained so that the tank is securely held in place during any movement of the vehicle because a loose tank could cause injury to passengers in the event of a motor accident, or in the case where the tank might otherwise become loose during normal vehicle travel. The latched position prevents the clamping arrangement 32 from pivoting upwardly and undesirably releasing the tank unless the vehicle is first placed in a stationary and parked position such as defined by actuating park brake switch 306 to positively engage the parking brake.

When it is desired to release the tank from mounting bracket assembly 12, the parking brake switch 306 is in the on position and the switch(es) of control arrangement 252 is/are in an off position. Turning on the switch(es) of control arrangement 252, such as by using handle 310 (FIG. 18), will allow energization of the motorized actuator assembly inside the electrical latching mechanism 274 so that the pawl 292 will disengage pin 88. Release of pin 88 will enable the clamping arrangement 32 to spring back upwardly and automatically to a disengaged position so that the tank may be removed.

Thus, unless both the parking brake switch 306 and the switch(es) of the control arrangement 252 are both in the on position, it will normally be impossible for the tank to be released from the mounting bracket assembly 12. Removal of the tank is prevented unless the vehicle is in a parked and stationary position, such as defined by the engagement of the parking brake via actuation of switch 306, and verification of tank release is made by simultaneous actuation of the control arrangement 252 via any one or more of the switch on seat bottom 18, switch(es) located elsewhere on the vehicle which are connected to the electric latching mechanism 274 or by remote control actuation of the switch(es). An alternative control arrangement configuration might be utilized to sense that the vehicle transmission has been placed in a parked position.

The control arrangement 252 used in combination with the electric latching mechanism 274 ensures that tank release will occur only under the proper conditions when the vehicle is stationary and parked in a substantially level position. Without provision of the control arrangement 252, an undesirable tank release might occur when the vehicle is in a parked condition on a steep decline.

As a mechanical backup, such as in the event of an electrical failure, the pawl 292 may be released from pin 88 by sliding the plunger 300 into engagement with portion 298 (FIG. 18) of the catch inside the electrical latching mechanism 274.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

What is claimed is:

1. A mounting bracket assembly installed in a vehicle for releasably holding an elongated self-contained breathing apparatus comprising:

a clamping arrangement secured on a mounting structure and movable between an unlatched disengaged position and a latched engaged position relative to a self-contained breathing apparatus, the clamping arrangement including a powered latching mechanism engageable with a portion of the clamping arrangement for providing the unlatched and latched position; and a control arrangement separate from the powered latching mechanism and operatively connected thereto to selectively control the powered latching mechanism, enable automatic movement of the clamping arrangement from the engaged position to the disengaged position and effect release of the self-contained breathing apparatus from the latched position when the vehicle is in a stationary and parked condition.

2. The mounting bracket assembly of claim 1, wherein the powered latching mechanism and the control arrangement are operatively connected to an electrical system of the vehicle.

3. The mounting bracket assembly of claim 1, wherein the powered latching mechanism is an electric latching mechanism positioned outside the mounting structure and connected to the clamping arrangement.

4. The mounting bracket assembly of claim 1, wherein the clamping arrangement is mounted for vertical movement on the mounting structure, and the powered latching mechanism is movable with the clamping arrangement along the mounting structure.

5. The mounting bracket assembly of claim 1, wherein the latched position is attained by a mechanical locking of the portion of the clamping arrangement in the powered latching mechanism, and is maintained during normal travel of the vehicle.

6. The mounting bracket assembly of claim 1, wherein the powered latching mechanism and the control arrangement are connected to a device for indicating that the vehicle is in the stationary and parked position.

7. The mounting bracket assembly of claim 6, wherein the device is a parking brake switch.

8. The mounting bracket assembly of claim 7, wherein the control arrangement is at least one control device located in the vehicle.

9. The mounting bracket assembly of claim 8, wherein the control device is a switch located within a seat cushion of a seat equipped with the mounting bracket assembly.

10. The mounting bracket assembly of claim 9, wherein the switch is controlled by movement of a handle at a front portion of the seat cushion.

11. The mounting bracket assembly of claim 9, wherein the parking brake switch and the switch of the control arrangement must be in an on position to effect release of the self-contained breathing apparatus from the latched position.

12. The mounting bracket assembly of claim 9, wherein the parking brake switch and the switch of the control arrangement are in an off position during normal travel of the vehicle.

\* \* \* \* \*